(12) United States Patent
Lee

(10) Patent No.: US 10,931,645 B2
(45) Date of Patent: Feb. 23, 2021

(54) METHOD AND DEVICE FOR ENCODING MULTIMEDIA DATA, AND METHOD AND DEVICE FOR DECODING SAME

(71) Applicant: SAMSUNG ELECTRONICS CO., LTD., Suwon-si (KR)

(72) Inventor: Nam-suk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 202 days.

(21) Appl. No.: 15/741,117

(22) PCT Filed: Jun. 24, 2016

(86) PCT No.: PCT/KR2016/006730
§ 371 (c)(1),
(2) Date: Dec. 29, 2017

(87) PCT Pub. No.: WO2017/003133
PCT Pub. Date: Jan. 5, 2017

(65) Prior Publication Data
US 2018/0191690 A1     Jul. 5, 2018

(30) Foreign Application Priority Data

Jul. 2, 2015 (KR) .................. 10-2015-0094932

(51) Int. Cl.
*H04L 29/06* (2006.01)
*H04N 21/2347* (2011.01)
(Continued)

(52) U.S. Cl.
CPC ......... *H04L 63/0428* (2013.01); *H04N 19/13* (2014.11); *H04N 19/91* (2014.11);
(Continued)

(58) Field of Classification Search
CPC ............................. H04L 63/102; H04N 19/91
See application file for complete search history.

(56) References Cited

U.S. PATENT DOCUMENTS 7,801,820 B2   9/2010   Molaro
8,731,193 B2   5/2014   Farkash et al.
(Continued)

FOREIGN PATENT DOCUMENTS

CN   102804766 A   11/2012
CN   105981327 A    9/2016
(Continued)

OTHER PUBLICATIONS

International Search Report, issued by International Searching Authority in International Application No. PCT/KR2016/006730, dated Sep. 27, 2016, (PCT/ISA/210).
(Continued)

*Primary Examiner* — Jeffrey C Pwu
*Assistant Examiner* — Thong P Truong
(74) *Attorney, Agent, or Firm* — Sughrue Mion, PLLC

(57) ABSTRACT

One embodiment of the present disclosure provides a method of generating an encrypted multimedia bitstream, the method comprising: obtaining processed multimedia data; selecting an object to be encrypted from among the processed multimedia data; encrypting the selected object to be encrypted; converting the processed multimedia data into encrypted multimedia data, based on a result of the encrypting; and generating encrypted multimedia bitstream by encoding the encrypted multimedia data.

14 Claims, 20 Drawing Sheets

(51) Int. Cl.
*H04N 19/13* (2014.01)
*H04N 21/845* (2011.01)
*H04N 19/91* (2014.01)

(52) U.S. Cl.
CPC ... *H04N 21/2347* (2013.01); *H04N 21/23476* (2013.01); *H04N 21/8456* (2013.01)

(56) References Cited

U.S. PATENT DOCUMENTS

| | | | |
|---|---|---|---|
| 10,530,571 | B2 | 1/2020 | Moon et al. |
| 2004/0037421 | A1 | 2/2004 | Truman |
| 2007/0009047 | A1 | 1/2007 | Shim et al. |
| 2007/0083467 | A1 | 4/2007 | Lindahl et al. |
| 2009/0129481 | A1 | 5/2009 | MacInnis et al. |
| 2009/0323950 | A1* | 12/2009 | Nakagata ............. G09C 5/00 380/243 |
| 2011/0075842 | A1 | 3/2011 | Le Barz et al. |
| 2012/0011596 | A1 | 1/2012 | Kim et al. |
| 2012/0308008 | A1* | 12/2012 | Kondareddy ......... H04W 12/02 380/273 |
| 2013/0114668 | A1 | 5/2013 | Misra et al. |
| 2013/0272430 | A1* | 10/2013 | Sullivan ............... H04N 19/88 375/240.26 |
| 2013/0293738 | A1* | 11/2013 | Kulkarni ............... H04N 19/63 348/222.1 |
| 2014/0376720 | A1* | 12/2014 | Chan .................. H04N 21/2351 380/239 |

FOREIGN PATENT DOCUMENTS

| | | |
|---|---|---|
| EP | 1478185 A2 | 11/2004 |
| KR | 2002-0096207 A | 12/2002 |
| KR | 10-2007-0006445 A | 1/2007 |
| WO | 2010/150056 A1 | 12/2010 |
| WO | 2015/088296 A1 | 6/2015 |

OTHER PUBLICATIONS

Written Opinion, issued by International Searching Authority in International Application No. PCT/KR2016/006730, dated Sep. 27, 2016, (PCT/ISA/237).

Communication dated Jun. 14, 2019, issued by the European Patent Office in counterpart European Application No. 16 818 166.7.

Communication dated Jul. 5, 2019, issued by the Korean Intellectual Property Office in counterpart Korean Application No. 10-2015-0094932.

Communication dated Apr. 12, 2018, issued by the European Patent Office in counterpart European Patent Application No. 16818166.7.

Communication dated Jan. 9, 2020, issued by the State Intellectual Property Office of P.R. China in counterpart Chinese Application No. 201680038934.1.

Communication dated Aug. 19, 2020, issued by the State Intellectual Property Office of P.R. China in Chinese Application No. 201680038934.1.

* cited by examiner

| RANGE OF VALUE | DIFF_VALUES | VALUES (V) | MAX_VAL (MV) | BITS (N) | BITS (N) | BOUNDARY-VARIABLE |
|---|---|---|---|---|---|---|
| 0 | 0 | 0 | 0 | 0 | 0 | 0 |
| 1 | -1,1 | 0,1 | 1 | 1 | 0,1 | 1 |
| 2 | -3,-2,2,3 | 0,1,2,3 | 3 | 2 | 00,~11 | 2 |
| 3 | -7,...,-4, 4,...,7 | 0~3, 4~7 | 7 | 3 | 000,~111 | 4 |
| 4 | -15,...,-8, 8,...,15 | 0~7, 8~15 | 15 | 4 | 0000,~1111 | 8 |
| 5 | -31,...,-16, 16,...,31 | 0~15, 16~31 | 31 | 5 | 00000,~11111 | 16 |
| 6 | -63,...,-32, 32...63 | 0~31, 32~63 | 63 | 6 | 000000,~111111 | 32 |
| 7 | -127,...,-64, 64,...,127 | 0~63, 64~127 | 127 | 7 | 0000000,~1111111 | 64 |
| 8 | -255,...,-128, 128,...,255 | 0~127, 128~255 | 255 | 8 | 00000000,~11111111 | 128 |
| 9 | -511,...,-256,256,...,511 | 0~255, 256~511 | 511 | 9 | 000000000,~111111111 | 256 |
| 10 | -1023,...,-512,512,...,1023 | 0~511, 512~1023 | 1023 | 10 | 0000000000,~1111111111 | 512 |
| 11 | -2047,...,-1024,1024,...,2047 | 0~1023, 1024~2047 | 2047 | 11 | 00000000000,~11111111111 | 1024 |

FIG. 17

| RANGE OF VALUE | DIFF_VALUES | VALUES (V) | MAX_VAL (MV) | BITS (N) | BITS (N) | BOUNDARY-VARIABLE |
|---|---|---|---|---|---|---|
| 0 | 0 | 0 | 0 | 0 | 0 | 0 |
| 1 | -1,1 | 0,1 | 1 | 1 | 0,1 | 1 |
| 2 | -3,-2,2,3 | 0,1,2,3 | 3 | 2 | 00,~11 | 2 |
| 3 | -7,...,-4, 4,...,7 | 0~3, 4~7 | 7 | 3 | 000,~111 | 4 |
| 4 | -15,...,-8, 8,...,15 | 0~7, 8~15 | 15 | 4 | 0000,~1111 | 8 |
| 5 | -31,...,-16, 16,...,31 | 0~15, 16~31 | 31 | 5 | 00000,~11111 | 16 |
| 6 | -63,...,-32, 32,...63 | 0~31, 32~63 | 63 | 6 | 000000,~111111 | 32 |
| 7 | -127,...,-64, 64,...,127 | 0~63, 64~127 | 127 | 7 | 0000000,~1111111 | 64 |
| 8 | -255,...,-128, 128,...,255 | 0~127, 128~255 | 255 | 8 | 00000000,~11111111 | 128 |
| 9 | -511,...,-256,256,...,511 | 0~255, 256~511 | 511 | 9 | 000000000,~111111111 | 256 |
| 10 | -1023,...,-512,512,...,1023 | 0~511, 512~1023 | 1023 | 10 | 0000000000,~1111111111 | 512 |
| 11 | -2047,...,-1024,1024,...,2047 | 0~1023, 1024~2047 | 2047 | 11 | 00000000000,~11111111111 | 1024 |

1710, 1720, 1730, 1740

METHOD AND DEVICE FOR ENCODING MULTIMEDIA DATA, AND METHOD AND DEVICE FOR DECODING SAME

TECHNICAL FIELD

The present disclosure relates to a method of providing data, and more particularly, to a method and apparatus for encrypting multimedia data and a method and apparatus for decrypting multimedia data.

BACKGROUND ART

Recently, in various fields, a compression technique is applied to efficiently process multimedia data.

Currently, various codecs for increasing a compression rate are being developed. For example, a codec for image compression may include Joint Photographic Experts Group (JPEG), JPEG 2000, lossless JPEG, portable network graphics (PNG), picture motion browser (PMB), or the like, and a codec for video compression may include motion JPEG, Moving Picture Experts Group-1 (MPEG-1), MPEG-2, MPEG-4, H.263, H.264, high efficiency video coding (HEVC), or the like. Also, a codec for audio compression may include MPEG-1 layer I, MPEG-1 layer II, MPEG-1 layer III, advanced audio coding (AAC), high-efficiency advanced audio coding (HE-AAC), free lossless audio codec (FLAC), or the like, and a codec for voice compression may include G.711, G.718, adaptive multi-rate (AMR), adaptive multi-rate wideband (AMR-WB), or the like.

Different compression methods are used for different types of multimedia compression, and even if the type of multimedia is same, various compression methods are used for compression efficiency.

Because there is a rising issue with respect to personal information protection in the era of Internet of Things (IoT), there is an increasing demand for encryption/decrypting decryption of multimedia content. In particular, there is an increasing demand for a technique of performing encryption/decryption on a compressed multimedia data bitstream while maintaining its codec characteristic.

DETAILED DESCRIPTION OF THE INVENTION

Technical Problem

Provided are a method and technique of performing encryption/decryption on a compressed multimedia data bitstream while maintaining its codec characteristic.

Technical Solution

According to a first aspect of the present disclosure, there is provided a method of generating an encrypted multimedia bitstream, the method comprising: obtaining processed multimedia data; selecting an object to be encrypted from among the processed multimedia data; encrypting the selected object to be encrypted; converting the processed multimedia data into encrypted multimedia data, based on a result of the encrypting; and generating encrypted multimedia bitstream by encoding the encrypted multimedia data.

Advantageous Effects

It is possible to perform encryption/decryption on a compressed multimedia data bitstream while maintaining its codec characteristic.

DESCRIPTION OF THE DRAWINGS

FIG. 17 is a diagram for describing a method of decrypting decrypting an decrypting object to be decrypted by using a preset mapping table, the method being performed by a device 1000, according to some embodiments.

BEST MODE

Figure 1:
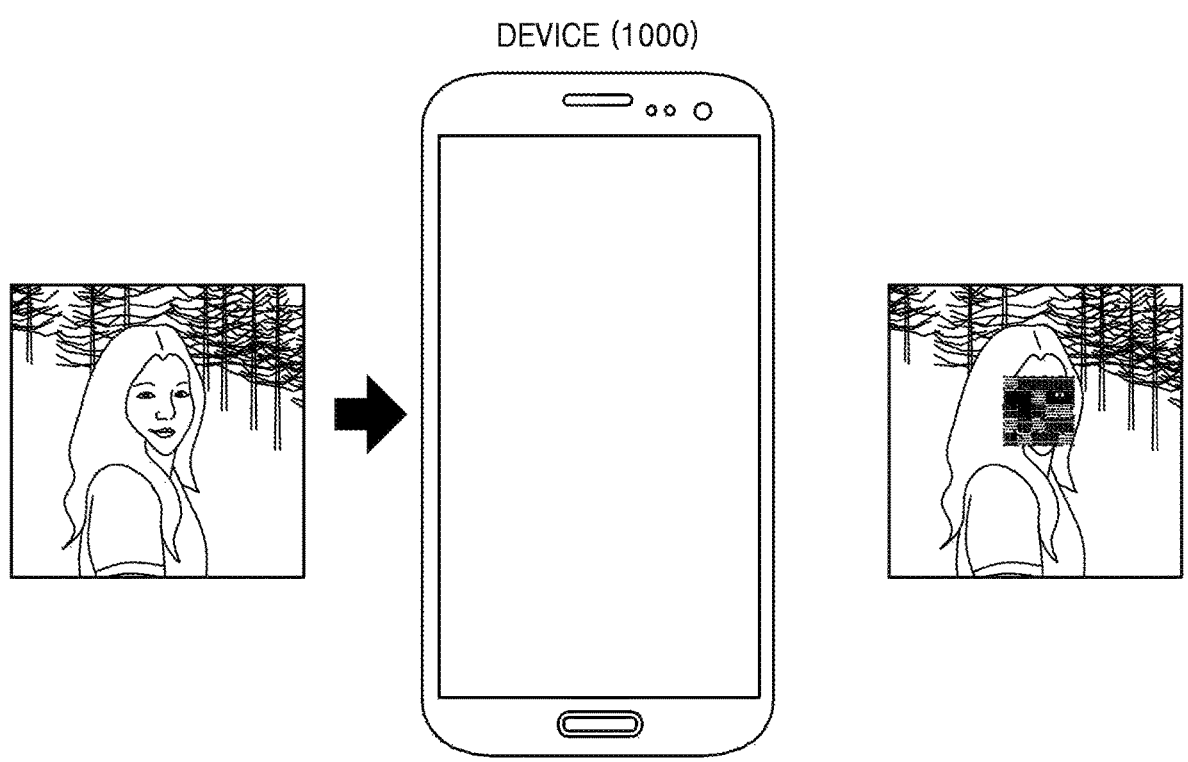
FIG. 1 is a diagram for describing a method of encrypting a multimedia bitstream, according to some embodiments.

According to a first aspect of the present disclosure, there is provided a method of generating an encrypted multimedia bitstream, the method including obtaining processed multimedia data; selecting an object to be encrypted from among the processed multimedia data; encrypting the selected object to be encrypted; converting the processed multimedia data into encrypted multimedia data, based on a result of the encrypting; and generating an encrypted multimedia bitstream by encoding the encrypted multimedia data.

The encoding may include entropy encoding, and the encrypting may be performed before the entropy encoding is performed.

The obtaining of the processed multimedia data may include obtaining a bitstream generated by encoding multimedia data based on a random codec; and obtaining the processed multimedia data by performing entropy decoding on the obtained bitstream.

The obtaining of the processed multimedia data may include obtaining multimedia data; performing quantization on the obtained multimedia data; and obtaining the processed multimedia data based on a result of the performing of the quantization.

The encrypting of the selected object to be encrypted may include directly encrypting the selected object to be encrypted, excluding a process of converting the selected object to be encrypted into a bitstream.

The encrypting of the selected object to be encrypted may include obtaining predetermined values corresponding to the selected object to be encrypted based on a preset mapping table; obtaining a bitstream by performing binary conversion on the predetermined values; obtaining an encrypted bitstream by applying an encryption process to the obtained bitstream; and obtaining encrypted data corresponding to the encrypted bitstream based on the preset mapping table.

In the obtaining of the bitstream by performing binary conversion on the predetermined values, bit size information of each of the predetermined values may be determined, and the binary conversion may be performed on the predetermined values based on the determined bit size information.

The encryption process may include directly encrypting the bitstream.

The selecting of the object to be encrypted may include selecting some of the processed multimedia data.

The selecting of the object to be encrypted may include selecting an entire portion of the processed multimedia data.

The method may further include obtaining metadata; selecting an object to be encrypted from the metadata; encrypting the selected object to be encrypted; converting the metadata into encrypted metadata based on a result of the encrypting; and converting the metadata into an encrypted meta bitstream by encoding the encrypted metadata.

According to a second aspect of the present disclosure, there is provided a method of decrypting an encrypted multimedia bitstream, the method including obtaining encrypted multimedia data by decoding encrypted multimedia bitstream; selecting an object to be decrypted from among the encrypted multimedia data; decrypting the selected object to be decrypted; converting the encrypted multimedia data into decrypted multimedia data, based on a result of the decrypting; and generating a decrypted multimedia bitstream by encoding the decrypted multimedia data.

The decoding may include entropy decoding and the encoding may include entropy encoding, and the decrypting may be performed after the entropy decoding is performed and before the entropy encoding is performed.

The decrypting of the selected object to be decrypted may include directly encrypting the selected object to be decrypted, excluding a process of converting the selected object to be decrypted into a bitstream.

The decrypting of the selected object to be decrypted may include obtaining predetermined values corresponding to the selected object to be decrypted based on a preset mapping table; obtaining a bitstream by performing binary conversion on the predetermined values; obtaining a decrypted bitstream by applying a decrypting process to the obtained bitstream; and obtaining decrypted data corresponding to the decrypted bitstream based on the preset mapping table.

In the obtaining of the bitstream by performing binary conversion on the predetermined values, bit size information of each of the predetermined values may be determined, and the binary conversion may be performed on the predetermined values based on the determined bit size information.

The decrypting process may include directly decrypting the bitstream.

The selecting of the object to be decrypted may further include searching for encrypted data from among the encrypted multimedia data; and selecting some of the searched data.

The selecting of the object to be decrypted may further include searching for encrypted data from among the encrypted multimedia data; and selecting all of the searched data.

The method may further include obtaining encrypted metadata; selecting an object to be decrypted from the encrypted metadata; decrypting the selected object to be decrypted; converting the encrypted metadata into decrypted metadata based on a result of the decrypting; and generating a decrypted multimedia bitstream by encoding the decrypted metadata.

According to a third aspect of the present disclosure, there is provided a device for generating an encrypted multimedia bitstream, the device including an encrypting interface configured to obtain processed multimedia data, select an object to be encrypted from among the processed multimedia data, convert the processed multimedia data into encrypted multimedia data by encrypting the selected object to be encrypted, and generate an encrypted multimedia bitstream by encoding the encrypted multimedia data.

The encoding may include entropy encoding, and the encrypting may be performed before the entropy encoding is performed.

The device may further include a communication interface configured to obtain a bitstream generated by encoding multimedia data based on a random codec, and the encrypting interface may be further configured to obtain the processed multimedia data by performing entropy decoding on the bitstream obtained by the communication interface.

The encrypting interface may be further configured to directly encrypt the selected object to be encrypted, excluding a process of converting the selected object to be encrypted into a bitstream.

The encrypting interface may be further configured to obtain predetermined values corresponding to the selected object to be encrypted based on a preset mapping table, obtain a bitstream by performing binary conversion on the predetermined values, obtain an encrypted bitstream by applying an encryption process to the obtained bitstream, and obtain encrypted data corresponding to the encrypted bitstream based on the preset mapping table.

The encrypting interface may be further configured to determine bit size information of each of the predetermined values, and perform the binary conversion on the predetermined values based on the determined bit size information.

The encrypting interface may be further configured to obtain metadata, select an object to be encrypted from the metadata, convert the metadata into encrypted metadata by encrypting the selected object to be encrypted; and generate an encrypted meta bitstream by encoding the encrypted metadata.

According to a fourth aspect of the present disclosure, there is provided a device for decrypting an encrypted multimedia bitstream, the device including a decrypting interface configured to obtain encrypted multimedia data by decrypting an encrypted multimedia bitstream, select an object to be decrypted from the encrypted multimedia data, decrypt the selected object to be decrypted, convert the encrypted multimedia data into decrypted multimedia data, based on a result of the decrypting, and generate a decrypted multimedia bitstream by encoding the decrypted multimedia data.

The decoding may include entropy decoding and the encoding may include entropy encoding, and the decrypting may be performed after the entropy decoding is performed and before the entropy encoding is performed.

The decrypting interface may be further configured to directly encrypt the selected decrypting object to be decrypted, excluding a process of converting the selected decrypting object to be decrypted into a bitstream.

The decrypting interface may be further configured to obtain predetermined values corresponding to the selected object to be decrypted based on a preset mapping table, obtain a bitstream by performing binary conversion on the predetermined values, obtain a decrypted bitstream by applying a decrypting process to the obtained bitstream, and obtain decrypted data corresponding to the decrypted bitstream based on the preset mapping table.

The decrypting interface may be further configured to determine bit size information of each of the predetermined values, and perform binary conversion on the predetermined values based on the determined bit size information.

The decrypting interface may be further configured to obtain encrypted metadata, select an object to be decrypted from the encrypted metadata, decrypt the selected object to be decrypted, convert the encrypted metadata into decrypted metadata based on a result of the decrypting, and generate a decrypted meta bitstream by encoding the decrypted metadata.

Mode of the Invention

Embodiments of the present disclosure will now be described more fully with reference to the accompanying drawings for one of ordinary skill in the art to be able to perform the present disclosure without any difficulty. The present disclosure may, however, be embodied in many different forms and should not be construed as being limited to the embodiments set forth herein. In the drawings, for a more clear description of the present disclosure, parts or units that are not related to the descriptions are omitted, and throughout the specification, like reference numerals in the drawings denote like elements.

Throughout the specification, it will also be understood that when an element is referred to as being "connected to" or "coupled with" another element, it can be directly connected to or coupled with the other element, or it can be electrically connected to or coupled with the other element by having an intervening element interposed therebetween. Also, when a part "includes" or "comprises" an element, unless there is a particular description contrary thereto, the part can further include other elements, not excluding the other elements.

Hereinafter, with reference to the accompanying drawings, the present disclosure will now be described in detail.

FIG. 1 is a diagram for describing a method of encrypting a multimedia bitstream, according to some embodiments.

According to some embodiments, a device 1000 may obtain processed multimedia data.

For example, the device 1000 may process obtained picture data, thereby obtaining processed picture data.

Also, the device 1000 may obtain a picture bitstream and may decode the obtained bitstream, thereby obtaining processed picture data. For example, the device 1000 may entropy decode the obtained bitstream, thereby obtaining processed picture data.

The device 1000 may select some of the processed multimedia data as an object to be encrypted. For example, the device 1000 may obtain processed picture data by processing picture data consisting of a plurality of blocks, and may select, as an object to be encrypted, data indicating a face of a person among from the processed picture data.

According to some embodiments, the device 1000 may not convert the selected object to be encrypted into a bitstream but may directly encrypt the selected object to be encrypted.

Also, the device 1000 may convert the selected object to be encrypted into the bitstream, and may encrypt the object to be encrypted in the form of a bitstream. In this case, the device 1000 may convert the encrypted bitstream into data, thereby obtaining encrypted data.

According to some embodiments, the device 1000 may encrypt the object to be encrypted, thereby obtaining the encrypted data. Also, the device 1000 may convert the processed multimedia data into encrypted multimedia data by converting the object to be encrypted among the processed multimedia data into the encrypted data.

The device 1000 may generate an encrypted multimedia bitstream by encoding the encrypted multimedia data.

Encoding may include entropy encoding. The entropy encoding refers to a method of converting data into a bitstream. For example, the device 1000 may convert the encrypted multimedia data into a combination of 1 and 0 by using the entropy encoding.

According to some embodiments, the device 1000 may encrypt the selected object to be encrypted before entropy encoding is performed. The device 1000 may encrypt the object to be encrypted before entropy encoding is performed, thereby generating the encrypted multimedia bitstream that is usable by an existing decoding device.

Figure 2:
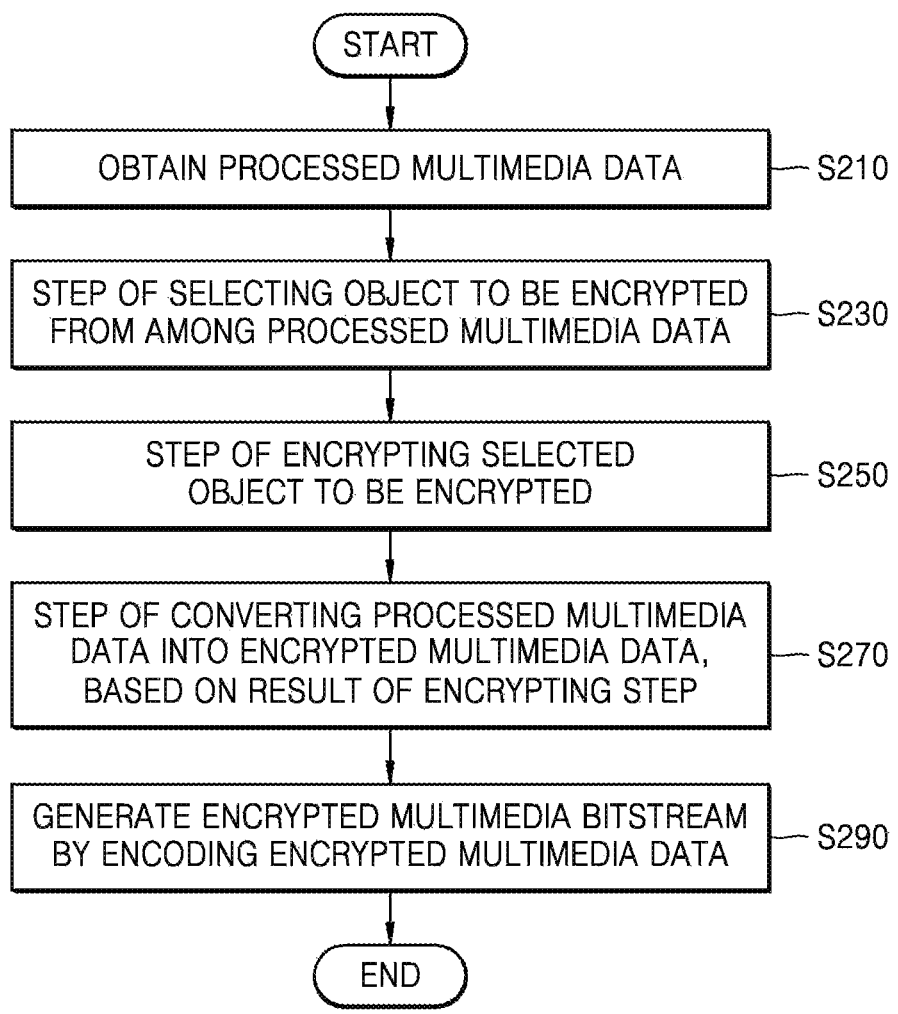
FIG. 2 is a diagram for describing a method of generating an encrypted multimedia bitstream, according to some embodiments.

FIG. 2 is a diagram for describing a method of generating an encrypted multimedia bitstream, according to some embodiments.

In operation S210, the device 1000 may obtain processed multimedia data.

According to some embodiments, the device 1000 may obtain multimedia data. The multimedia data refers to various types of data where voice, texts, pictures, video, etc. are mixed. For example, the multimedia data may include, but is not limited to, picture data, song data, video data, audio data, text data, flash data, or the like.

According to some embodiments, the device 1000 may obtain metadata. The metadata refers to data for describing multimedia data. For example, the metadata may include a manufacturer of a camera used in generating the multimedia data, model information of the camera, or a combination thereof. Also, the metadata may include, but is not limited to, information about a direction of the camera when the multimedia data is generated, date and time, a focal length of the camera, On/Off of a flash of the camera, an ISO speed of the camera, a shutter speed of the camera, a position of the camera, global positioning system (GPS), or the like.

According to some embodiments, the metadata of the multimedia data may have various formats. For example, the metadata of the multimedia data may have, but is not limited to, a Machine-Readable Cataloging (MARC) format, a Dublin Core format, a tag format, and an exchangeable image file format.

The device 1000 may apply at least one sub-coding module to the multimedia data, the metadata, or the combination thereof. A sub-coding module refers to a sub-module used in applying various codecs to and compressing the multimedia data, the metadata, or the combination thereof. For example, the sub-coding module may include, but is not limited to, a discrete cosine transform (DCT) transformation module, a quantization module, a prediction module, an entropy-coding module, and an entropy-decoding module.

The device 1000 may include a plurality of sub-coding modules. The plurality of sub-coding modules may be implemented by one processor, may each be implemented by respective processors, or may be implemented by a plurality of processors, but the present disclosure is not limited thereto.

The device 1000 may apply at least one sub-coding module to the multimedia data, thereby obtaining processed multimedia data. For example, the device 1000 may apply the DCT transformation module and the quantization module to the multimedia data, thereby obtaining the processed multimedia data.

Also, the device 1000 may apply at least one sub-coding module to the metadata, thereby obtaining the processed multimedia data.

The processed multimedia data may include various parameters generated in a process of encoding the multimedia data. For example, the processed multimedia data may include, but is not limited to, a differentially-coded DC value, quantized samples, and AC coded samples.

According to another embodiment, the device 1000 may obtain the processed multimedia data by using a multimedia bitstream.

The device 1000 may directly encode the multimedia data, thereby obtaining the multimedia bitstream. Also, the device 1000 may receive the multimedia bitstream from an external device.

A bitstream includes at least one bit group, and a bit refers to a unit of data. Also, the multimedia bitstream refers to a bitstream generated by applying a codec to and compressing the multimedia data, and a meta bitstream indicates a bitstream converted from the metadata. For example, the multimedia bitstream may include a group of bits, and the group of bits may indicate pictures.

The device 1000 may apply a sub-coding module to the multimedia bitstream, thereby obtaining processed multimedia data. For example, the device 1000 may apply an entropy-decoding module to the multimedia bitstream, thereby obtaining the processed multimedia data.

The entropy-decoding module refers to a module to perform entropy decoding. Entropy decoding indicates a coding method of converting a bitstream into data corresponding to the bitstream. The entropy decoding may include, but is not limited to, a Huffman method, an arithmetic transformation coding method, or the like.

In operation S230, the device 100 may select an object to be encrypted from among the processed multimedia data.

According to some embodiments, the device 1000 may select an object to be encrypted.

For example, the device 1000 may select, as the object to be encrypted, some of the processed multimedia data. Also, the device 1000 may select, as the object to be encrypted, an entire portion of the processed multimedia data.

For example, the device 1000 may obtain processed picture data by processing picture data consisting of a plurality of blocks, and may select, as the object to be encrypted, data indicating a first block from among the processed picture data.

The device 1000 may select the object to be encrypted based on a preset criterion. For example, in a case where a person included in the picture data is preset as the object to be encrypted, the device 1000 may process the picture data, and may select, as the object to be encrypted, data indicating the person from among the processed picture data.

Also, the device 1000 may select the object to be encrypted based on a user input. For example, in a case where a user inputs, as the object to be encrypted, a person included in the picture data, the device 1000 may process the picture data, and may select, as the object to be encrypted, data indicating the person from among the processed picture data.

According to some embodiments, the selected object to be encrypted may include various parameters. For example, the selected object to be encrypted may include, but is not limited to, a differentially-coded DC value, quantized samples, or AC coded samples.

Also, the device 1000 may select the metadata as the object to be encrypted. For example, the device 1000 may select, as the object to be encrypted, an entire portion of the metadata, some of the metadata, or the processed metadata.

In operation S250, the device 1000 may encrypt the selected object to be encrypted.

According to some embodiments, the device 1000 may not convert the selected object to be encrypted into a bitstream but may directly encrypt the selected object to be encrypted.

For example, the device 1000 may encrypt the object to be encrypted by applying a predetermined function to values of the parameters included in the object to be encrypted.

As another example, the device 1000 may encrypt the object to be encrypted by exchanging parameters of a first block included in the object to be encrypted with parameters of a second block, base on a preset rule.

Also, the device 1000 may encrypt the object to be encrypted by changing a sign of the values of the parameters included in the object to be encrypted.

Also, the device 1000 may encrypt the object to be encrypted by changing a sign of the parameters included in the processed multimedia data by using a preset encryption key.

According to another embodiment, the device 1000 may convert the selected object to be encrypted into the bitstream, may encrypt the bitstream, and may convert the encrypted bitstream into data, thereby encrypting the object to be encrypted.

The device 1000 may convert the selected object to be encrypted from among the processed multimedia data into the bitstream.

For example, the device 1000 may map the object to be encrypted to a preset mapping table, thereby obtaining predetermined values corresponding to the object to be encrypted. Also, the device 1000 may perform binary conversion on the obtained predetermined values, thereby obtaining the bitstream corresponding to the object to be encrypted.

When the device 1000 performs binary conversion, the device 1000 may perform binary conversion based on bit size information of each of the predetermined values.

The device 1000 may encrypt the obtained bitstream. For example, the device 1000 may encrypt the obtained bitstream by using an encryption method applicable to the bitstream. The encryption method applicable to the bitstream may include, but is not limited to, Advanced Encryption Standard (AES), Blowfish, Data Encryption Standard (DES), Serpent, Twofish, Camellia, CAST-128, International Data Encryption Algorithm (IDEA), RC2, RC5, SEED, or the like.

The device 1000 may convert the encrypted bitstream into data, thereby obtaining encrypted data. For example, the device 1000 may obtain the predetermined values by performing binary inverse-conversion on the encrypted bitstream, and may obtain encrypted data by mapping the predetermined values to the preset mapping table.

According to some embodiments, the encrypted data may be limited to a value in a range allowable to a codec. For example, when the device 1000 encrypts a multimedia bitstream coded as JPEG, data encrypted by the device 1000 may be limited to a range allowable to JPEG.

In operation S270, the device 1000 may convert the processed multimedia data into encrypted multimedia data, based on a result of the encrypting.

According to some embodiments, the device 1000 may obtain the encrypted data by encrypting the object to be encrypted. Also, the device 1000 may convert the object to be encrypted from among the processed multimedia data into the encrypted data, so that the device 1000 may convert the processed multimedia data into the encrypted multimedia data. Also, the device 1000 may convert the object to be encrypted from among the processed metadata into the encrypted data, so that the device 1000 may convert the processed metadata into encrypted metadata.

For example, when the object to be encrypted selected by the device 1000 is a first block from among picture data consisting of a plurality of blocks, the device 1000 may obtain encrypted data by encrypting data indicating the first block. The device 1000 may convert data indicating the first block from among processed picture data into the encrypted data, so that the device 1000 may obtain encrypted picture data.

In operation S290, the device 1000 may generate an encrypted multimedia bitstream by encoding the encrypted multimedia data.

The device 1000 may encode the encrypted multimedia data, thereby generating the encrypted multimedia bitstream. Also, the device 1000 may encode the encrypted metadata, thereby generating an encrypted meta bitstream.

For example, when the device 1000 selects, as the object to be encrypted, data indicating a person from among the processed picture data, the device 1000 may generate encrypted multimedia data by converting the data indicating the person from among the processed picture data into encrypted data, and may generate an encrypted picture bitstream by encoding the encrypted multimedia data.

Encoding may include entropy encoding. The entropy encoding refers to a method of converting data into a bitstream. For example, the device 1000 may convert the encrypted multimedia data into a combination of 1 and 0 by using the entropy encoding.

The entropy decoding may include, but is not limited to, Huffman coding, arithmetic transformation coding, run-length coding, context-adaptive variable-length coding (CAVLC), context-adaptive binary arithmetic coding (CABAC), or the like.

According to some embodiments, the device 1000 may apply, to the encrypted multimedia data, entropy coding corresponding to a codec applied to the multimedia bitstream.

For example, when the codec applied to the multimedia bitstream is H.265, and an entropy coding method used in H.265 is CABAC, the device 1000 may entropy encode the encrypted multimedia data by using CABAC.

According to some embodiments, the device 1000 may encrypt the selected object to be encrypted before entropy encoding is performed. The device 1000 encrypts the selected object to be encrypted before entropy encoding is performed, so that the device 1000 may generate the encrypted multimedia bitstream that is usable by an existing decoding device.

Figure 3:
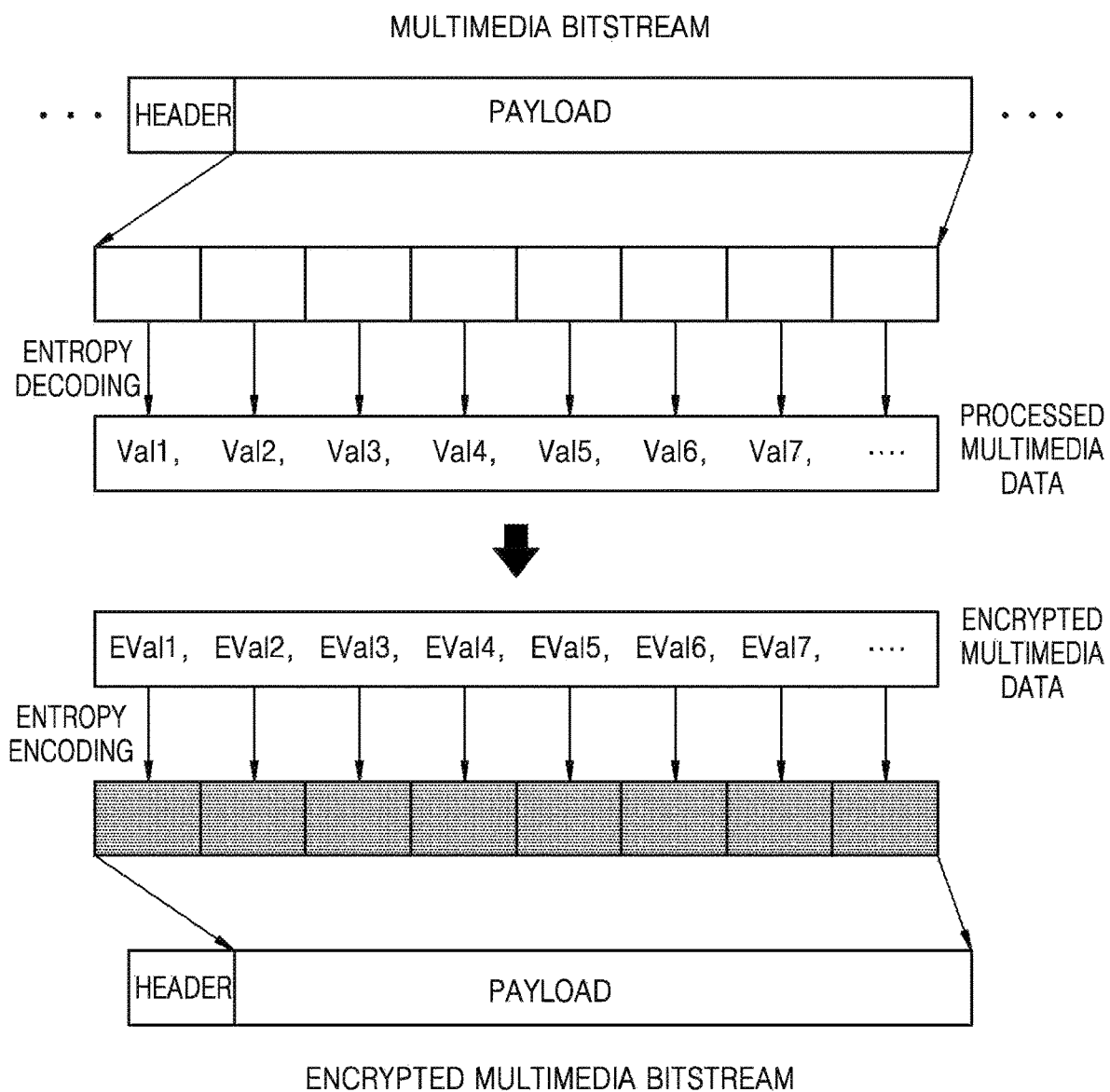
FIG. 3 is a diagram for describing a method of obtaining an encrypted multimedia bitstream based on a multimedia bitstream, according to some embodiments.

FIG. 3 is a diagram for describing a method of obtaining an encrypted multimedia bitstream based on a multimedia bitstream, according to some embodiments.

The device 1000 may obtain a multimedia bitstream. For example, the device 1000 may receive the multimedia bitstream from an external device, or may obtain the multimedia bitstream by encoding multimedia data.

The multimedia bitstream may include a plurality of bit groups. Also, the plurality of bit groups may each include a header region and a payload region.

The device 1000 may perform entropy decoding on the multimedia bitstream, thereby obtaining processed multimedia data. The processed multimedia data may include a plurality of parameters (Val1, Val2, Val3, Val4, Val5, Val6, . . . ).

The device 1000 may select an object to be encrypted from among the processed multimedia data. For example, the device 1000 may select, as the object to be encrypted, some of the plurality of parameters (Val1, Val2, Val3, Val4, Val5, Val6, . . . ) included in the processed multimedia data. Also, the device 1000 may select, as the object to be encrypted, all of the plurality of parameters (Val1, Val2, Val3, Val4, Val5, Val6, . . . ) included in the processed multimedia data.

The device 1000 may encrypt the selected object to be encrypted. For example, the device 1000 may not convert the selected object to be encrypted into a bitstream but may directly encrypt the selected object to be encrypted. Also, the device 1000 may convert the selected object to be encrypted into the bitstream, may encrypt the bitstream, and may convert the encrypted bitstream into data, thereby obtaining encrypted data.

The device 1000 may encrypt the object to be encrypted, thereby converting the processed multimedia data into encrypted multimedia data. For example, the device 1000 may encrypt the plurality of parameters (Val1, Val2, Val3, Val4, Val5, Val6, . . . ) included in the processed multimedia data, thereby obtaining the encrypted multimedia data including encrypted data (EVal1, EVal2, EVal3, EVal4, EVal5, EVal6, . . . ).

The device 1000 may generate an encrypted multimedia bitstream by encoding the encrypted multimedia data.

Encoding may include entropy encoding. Entropy encoding refers to a method of converting data into a bitstream. For example, the device 1000 may convert a parameter into a combination of 1 and 0 by using entropy encoding.

Entropy encoding may include, but is not limited to, Huffman coding, arithmetic transformation coding, fixed length coding, CAVLC, CABAC, or the like.

According to some embodiments, the device 1000 may obtain encrypted metadata by using the same method of obtaining the encrypted multimedia bitstream.

Figure 4:
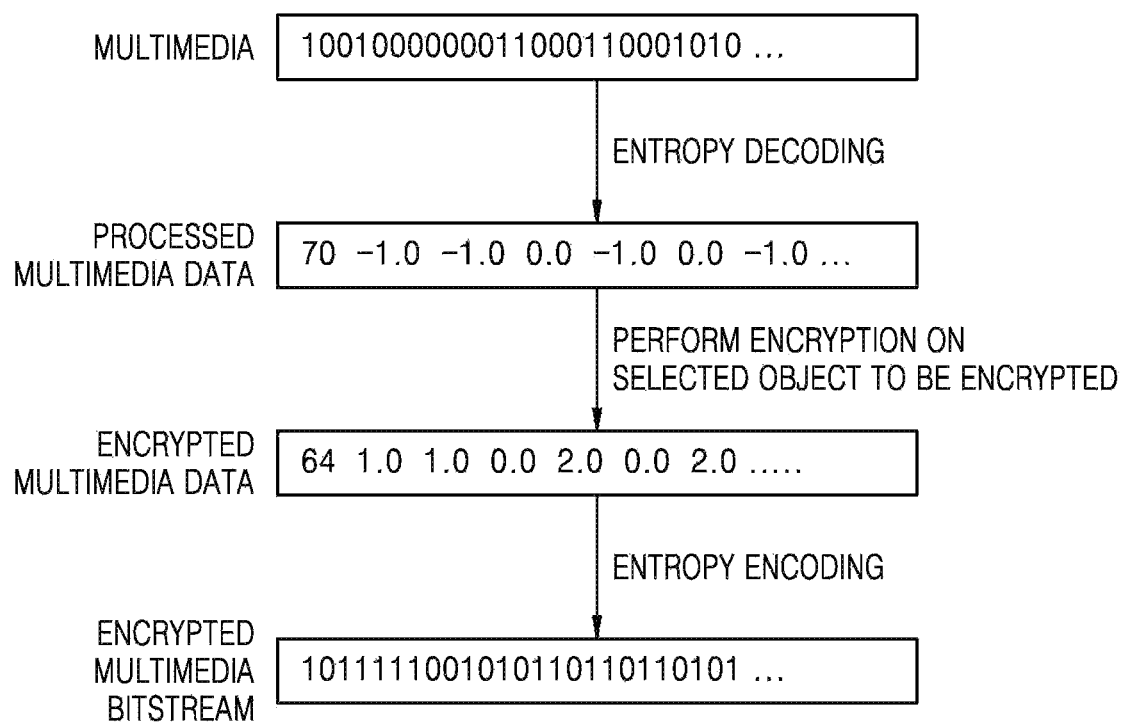
FIG. 4 is a diagram for describing a method of converting a multimedia bitstream into an encoded multimedia bitstream, according to some embodiments.

FIG. 4 is a diagram for describing a method of converting a multimedia bitstream into an encoded multimedia bitstream, according to some embodiments.

The device 1000 may obtain a multimedia bitstream. For example, the device 1000 may receive the multimedia bitstream from an external device, or may obtain the multimedia bitstream by encoding multimedia data.

The device 1000 may perform entropy decoding on the multimedia bitstream, thereby obtaining processed multimedia data. The processed multimedia data may include a plurality of parameters (70, −1, −1, 0, −1, . . . ).

The device 1000 may select an object to be encrypted from among the processed multimedia data. For example, the device 1000 may select, as the object to be encrypted, some of the plurality of parameters (70, −1, −1, 0, −1, . . . ) included in the processed multimedia data. Also, the device 1000 may select, as the object to be encrypted, all of the plurality of parameters (70, −1, −1, 0, −1, . . . ) included in the processed multimedia data.

The device 1000 may convert the object to be encrypted into encrypted data by encrypting the selected object to be encrypted. For example, the device 1000 may obtain encrypted data (64, 1, 1, 0, 1, . . . ) by encrypting the plurality of parameters (70, −1, −1, 0, −1, . . . ) included in the processed multimedia data.

According to some embodiments, the device 1000 may not convert the selected object to be encrypted into a bitstream but may directly encrypt the selected object to be encrypted.

According to another embodiment, the device 1000 may convert the selected object to be encrypted (70, −1, −1, 0, −1, . . . ) into a bitstream, may encrypt the bitstream, and may convert the encrypted bitstream into data, thereby converting the object to be encrypted into the encrypted data (64, 1, 1, 0, 1, . . . ).

The device 1000 may generate an encrypted multimedia bitstream by encoding the encrypted multimedia data including the encrypted data.

Encoding may include entropy encoding. The entropy encoding refers to a method of converting data into a bitstream. For example, the device 1000 may convert a plurality of parameters into a combination of 1 and 0 by using the entropy encoding.

The entropy encoding may include, but is not limited to, Huffman coding, arithmetic transformation coding, fixed length coding, CAVLC, CABAC, or the like.

According to some embodiments, the device 1000 may convert a meta bitstream into an encrypted meta bitstream by using the same method of converting the multimedia bitstream into the encrypted multimedia bitstream.

Figure 5:
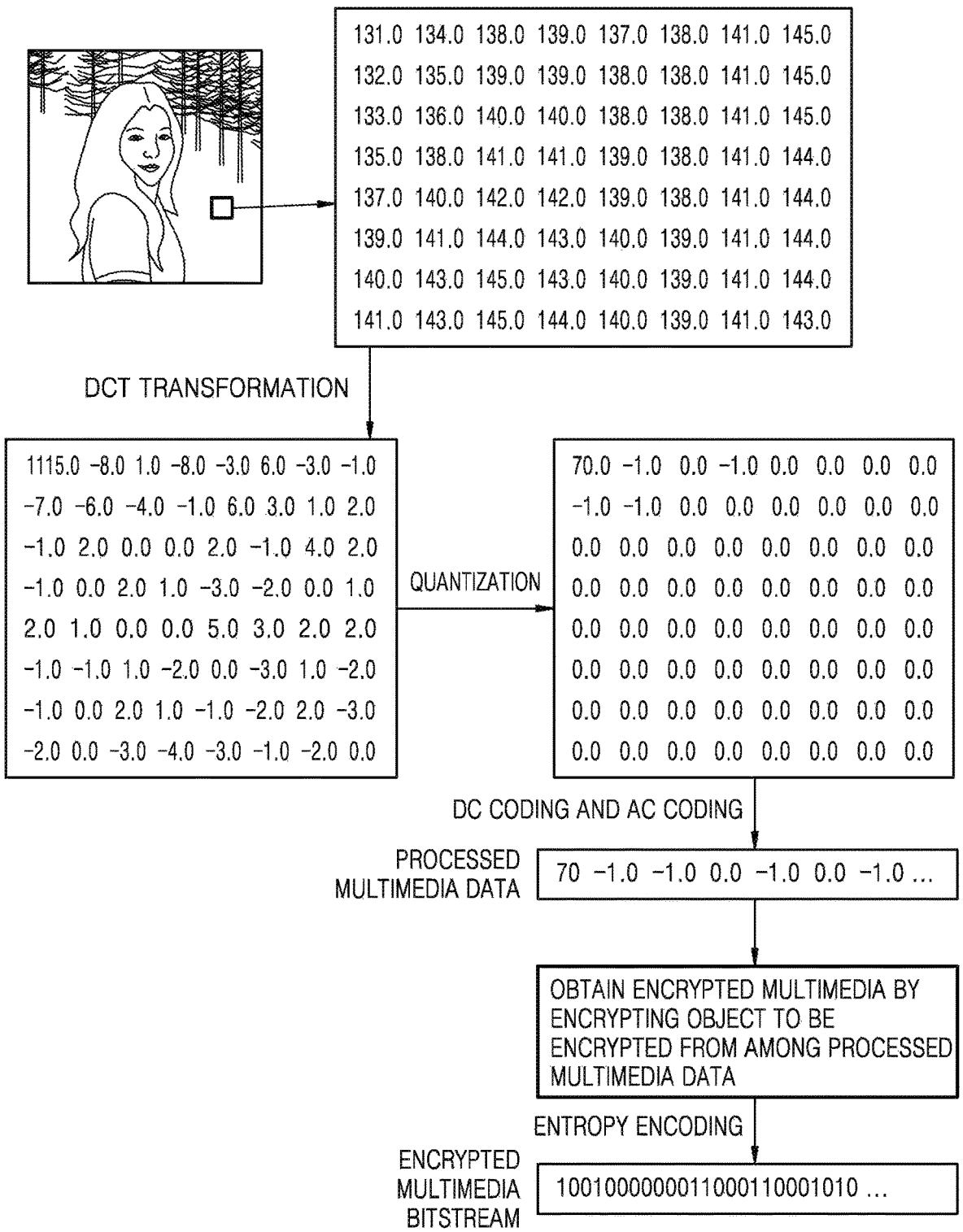
FIG. 5 is a diagram for describing a method of generating an encrypted bitstream from an image, according to some embodiments.

FIG. 5 is a diagram for describing a method of generating an encrypted bitstream from an image, according to some embodiments.

According to some embodiments, image data may be divided into a plurality of blocks. For example, the image data may be divided into a plurality of blocks having a size of 4×4, 8×8, or 16×16, but the present disclosure is not limited thereto.

Referring to FIG. 5, picture data may be divided into a plurality of blocks each having a size of 8×8. Each of the plurality of blocks having a size of 8×8 may have 64 sample values.

According to some embodiments, the device 1000 may apply DCT transformation on each of the plurality of blocks. As a result, the device 1000 may obtain DCT transformed sample values.

According to some embodiments, the device 1000 may quantize the DCT transformed sample values. As a result, the device 1000 may obtain the quantized sample values.

The device 1000 may perform DC coding and AC coding on the quantized sample values, thereby obtaining processed multimedia data.

The device 1000 may select an object to be encrypted from among the processed multimedia data. For example, the device 1000 may select, as the object to be encrypted, some of parameters indicating a first block.

Also, the device 1000 may select, as the object to be encrypted, parameters indicating some blocks from among parameters indicating the plurality of blocks.

For example, the device 1000 may select, as the object to be encrypted, blocks included in a face of a person from among blocks included in the picture data, and may select, as the object to be encrypted, parameters indicating the blocks included in the face of the person from among the blocks included in the picture data.

The device 1000 may obtain encrypted multimedia data by encrypting the selected object to be encrypted from among the processed multimedia data. Also, the device 1000 may apply entropy coding on the encrypted multimedia data, thereby obtaining an encrypted multimedia bitstream.

Figure 6:
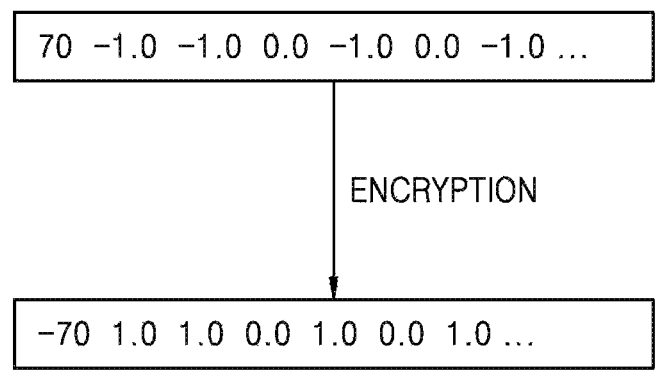
FIG. 6 is a diagram for describing a method of directly encrypting an object to be encrypted without converting the object to be encrypted into a bitstream, according to some embodiments.

FIG. 6 is a diagram for describing a method of directly encoding an object to be encrypted without converting the object to be encrypted into a bitstream, according to some embodiments.

According to some embodiments, the device 1000 may not convert an object to be encrypted into a bitstream but may directly encrypt the object to be encrypted.

For example, when the object to be encrypted is a plurality of parameters, the device 1000 may directly encrypt the plurality of parameters. For example, the device 1000 may change a sign of each of the plurality of parameters that are the object to be encrypted, thereby encrypting the plurality of parameters that are the object to be encrypted.

Also, for example, the device 1000 may change, by using a preset encryption key, a sign of each of the plurality of parameters that are the object to be encrypted, thereby encrypting the plurality of parameters that are the object to be encrypted.

Also, for example, when the object to be encrypted is the plurality of parameters indicating a first block, the device 1000 may encrypt the plurality of parameters that are the object to be encrypted by exchanging the plurality of parameters indicating the first block with parameters of another block, base on a preset rule.

Also, for example, when the object to be encrypted is the plurality of parameters indicating the first block, the device 1000 may encrypt the plurality of parameters that are the object to be encrypted by scrambling the plurality of parameters indicating the first block with parameters of another block.

Also, for example, the device 1000 may encrypt the plurality of parameters that are the object to be encrypted by changing the plurality of parameters by applying a specific function to the plurality of parameters that are the object to be encrypted.

Figure 7:
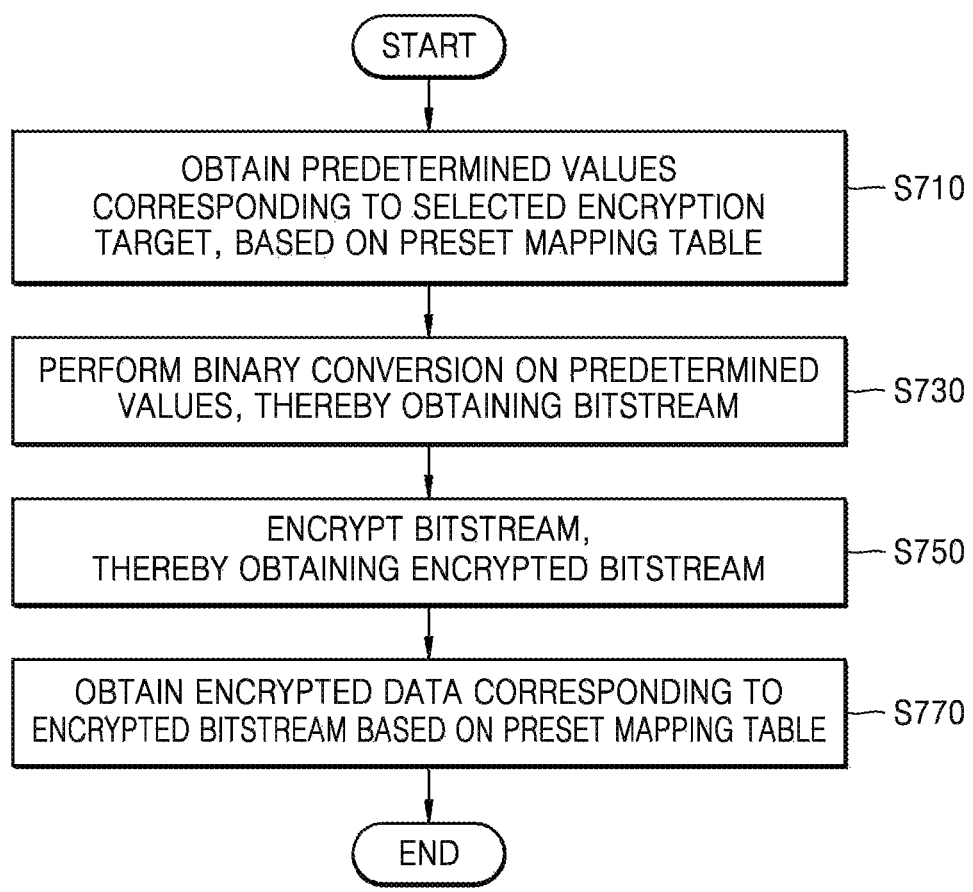
FIG. 7 is a diagram for describing a method of converting an object to be encrypted into a bitstream and directly encrypting the bitstream, according to some embodiments.

FIG. 7 is a diagram for describing a method of converting an object to be encrypted into a bitstream and directly encrypting the bitstream, according to some embodiments.

According to some embodiments, the device 1000 may convert a selected object to be encrypted into a bitstream, may encrypt the converted bitstream, and may convert the encrypted bitstream into data, thereby encrypting the object to be encrypted.

In operation S710, the device 1000 may obtain predetermined values corresponding to a selected object to be encrypted, based on a preset mapping table.

According to some embodiments, the object to be encrypted selected by the device 1000 may include a plurality of coefficients. For example, the object to be encrypted selected by the device 1000 may include a plurality of coefficients each having a value from among values that are greater than −1023 and less than 1023.

According to some embodiments, the device 1000 may determine a range of a value of each of coefficients included in the selected object to be encrypted, based on a mapping table.

For example, the mapping table may classify the range of each of the coefficients as a $0^{th}$ range (0), a $1^{st}$ range (−1, 1), a $2^{nd}$ range (−3, −2, 2, 3), a $3^{rd}$ range (−7, . . . , −4, 4, . . . , 7), a $4^{th}$ range (−15, . . . , −8, 8, . . . , 15), a $5^{th}$ range (−31, . . . , −16, 16, . . . , 31), a $6^{th}$ range (−63 . . . , −32, 32, . . . , 63), a $7^{th}$ range (−127, . . . , −64, 64, . . . , 127), an $8^{th}$ range (−255, . . . , −128, 128, . . . , 255), a $9^{th}$ range (−511, . . . , −256, 256, . . . , 511), a $10^{th}$ range (−1023, . . . , −512, 512, . . . , 1023), or an $11^{th}$ range (−2047, . . . , −1024, 1024, . . . , 2047). The device 1000 may determine the range of each of the coefficients to be one of the $0^{th}$ range through the $11^{th}$ range, based on the mapping table.

The device 1000 may change the mapping table whenever the device 1000 performs encryption, the mapping table being a reference of the range of the value of each of the coefficients included in the object to be encrypted. Alternatively, the device 1000 may determine the range of the value of each of the coefficients included in the object to be encrypted by consistently using the same mapping table.

The device 1000 may generate, change, or delete the mapping table, based on a user input. Also, the device 1000 may receive the mapping table from an external device, and may use a pre-stored mapping table.

The mapping table stored in the device 1000 may include various variables respectively corresponding to ranges included in the mapping table. For example, the mapping table stored in the device 1000 may include a maximum-value variable (MV). The maximum-value variable (MV) means a maximum value that may be included in each of divided regions.

For example, the mapping table stored in the device 1000 may include 0 as a maximum-value variable (MV) of a zeroth region, 1 as a maximum-value variable of a first region, and 3 as a maximum-value variable of a second region.

The device 1000 may match respective determined ranges of the values of the coefficients to the mapping table, thereby obtaining respective maximum-value variables corresponding to the determined ranges.

For example, when a range of a value of a first coefficient included in an object to be encrypted corresponds to a $0^{th}$ range, the device 1000 may match the $0^{th}$ range to the mapping table, thereby obtaining 0 that is a maximum-value variable corresponding to the $0^{th}$ range.

As another example, when the range of the value of the first coefficient included in the object to be encrypted corresponds to a $1^{st}$ range, the device 1000 may match the $1^{st}$ range to the mapping table, thereby obtaining 1 that is a maximum-value variable corresponding to the $1^{st}$ range.

As another example, when a range of a value of a second coefficient included in the object to be encrypted corresponds to a $2^{nd}$ range, the device 1000 may match the $2^{nd}$ range to the mapping table, thereby obtaining 3 that is a maximum-value variable corresponding to the $2^{nd}$ range.

The device 1000 may obtain a predetermined value, based on obtained respective values of coefficients included in an object to be encrypted, and maximum-value variables corresponding to determined ranges of the values of the coefficients included in the object to be encrypted.

$$\text{If(diff\_val<0)\{val=diff\_val+MV\}}$$

$$\text{else \{val=diff\_val\}} \qquad \text{[Equation 1]}$$

For example, the device 1000 may obtain a predetermined value by using Equation 1. diff_val indicates a value of a coefficient included in the object to be encrypted, val indicates a predetermined value, and MV indicates maximum-value variables corresponding to the respective determined ranges of the values of the coefficients.

For example, when a value (diff_val) of a first coefficient from among a plurality of coefficients included in an object to be encrypted is less than 0, the device 1000 may obtain a result of {value (diff_val) of first coefficient+maximum-value variable (MV)} as the predetermined value (val) corresponding to the first coefficient. When the value of the first coefficient from among the plurality of coefficients included in the object to be encrypted is greater than 0, the device 1000 may obtain the value (diff_val) of the first coefficient as the predetermined value (val) corresponding to the value of the first coefficient.

For example, when the value of the first coefficient from among the plurality of coefficients included in the object to be encrypted is −124, the device 1000 may obtain a range of the value of the first coefficient as the $7^{th}$ range (−127, . . . , −64, 64, . . . , 127), based on the mapping table. Also, the device 1000 may obtain, from the mapping table, 127 that is a maximum-value variable (MV) corresponding to the $7^{th}$ range.

The device 1000 may apply −124 that is the first coefficient to Equation 1. By applying the first coefficient to Equation 1, the device 1000 may obtain (val=−124+127=3) as a predetermined value.

In operation S730, the device 1000 may perform binary conversion on the predetermined values, thereby obtaining a bitstream.

According to some embodiments, the device 1000 may perform binary conversion on the obtained predetermined values. For example, the device 1000 may express the obtained predetermined values as 0 or 1 by performing binary conversion on the obtained predetermined values.

The device 1000 may determine bit size information of an obtained predetermined value. For example, the device 1000 may determine the bit size information, based on a range of a value of an object to be encrypted which corresponds to the obtained predetermined value.

For example, when the value of the first coefficient from among the plurality of coefficients included in the object to be encrypted is −124, the device 1000 may obtain the range of the value of the first coefficient as the $7^{th}$ range (−127, . . . , −64, 64, . . . , 127), based on the mapping table, and may obtain a predetermined value (val=3) corresponding to the first coefficient.

Also, the device 1000 may obtain bit size information of the obtained predetermined value (val=3), based on the range of the value of the first coefficient corresponding to the predetermined value.

For example, the device 1000 may map the $7^{th}$ range, which is the range of the value of the first coefficient, to the mapping table so that the device 1000 may obtain 7 that is the bit size information of the predetermined value.

The device 1000 may perform binary conversion on the obtained predetermined value, based on the bit size information.

For example, the device 1000 may perform binary conversion on the predetermined value (val=3) by using 7 bits. For example, the device 1000 may convert the predetermined value (val=3) into "0000011".

In operation S750, the device 1000 may apply an encryption process to the bitstream, thereby obtaining an encrypted bitstream.

According to some embodiments, the device 1000 may apply the encryption process to the bitstream. For example, the device 1000 may encrypt the bitstream by using the encryption process that is applicable to the bitstream.

The encryption process that is applicable to the bitstream may include, but is not limited to, AES, Blowfish, DES, Serpent, Twofish, Camellia, CAST-128, IDEA, RC2, RC5, and SEED.

The device 1000 may encrypt the bitstream, thereby obtaining the encrypted bitstream.

For example, the device 1000 may encrypt the bitstream "0000011" obtained based on the predetermined value, thereby obtaining an encrypted bitstream "0001101".

In operation S770, the device 1000 may obtain encrypted data corresponding to the encrypted bitstream based on the preset mapping table.

According to some embodiments, the device 1000 may apply binary inverse-conversion to the encrypted bitstream, thereby obtaining a predetermined value.

For example, when the encrypted bitstream is "0001101", the device 1000 may obtain 13 as a predetermined value by performing binary inverse-conversion on "0001101".

The device 1000 may map bit size information of the encrypted bitstream to the mapping table, thereby obtaining various information corresponding to the encrypted bitstream.

For example, the device 1000 may map the bit size information of the encrypted bitstream to the mapping table, thereby obtaining a boundary-variable of the encrypted bitstream.

For example, the device 1000 may match 7, which is the bit size information of the encrypted bitstream ("0001101"), to the mapping table so that the device 1000 may obtain 64 that is a boundary-variable corresponding to the encrypted bitstream ("0001101").

Also, the device 1000 may map the bit size information of the encrypted bitstream to the mapping table, thereby obtaining a maximum-value variable (MV) of the encrypted data corresponding to the encrypted bitstream. The maximum-value variable (MV) means a maximum value of a region including the encrypted data.

According to some embodiments, the device 1000 may obtain the encrypted data corresponding to the encrypted bitstream by using the predetermined value corresponding to the encrypted bitstream, the boundary-variable corresponding to the encrypted bitstream, and the maximum-value variable (MV) corresponding to the encrypted bitstream.

If(val2<limit){Eval=val2−MV} else {Eval=val2}  [Equation 2]

For example, the device 1000 may obtain the encrypted data by using Equation 2. val2 indicates a predetermined value corresponding to an encrypted bitstream, limit indicates a boundary-variable corresponding to the encrypted bitstream, and MV indicates maximum value information corresponding to the encrypted bitstream.

For example, when the predetermined value (val2) corresponding to the encrypted bitstream is less than the boundary-variable (limit) corresponding to the encrypted bitstream, the device 1000 may determine a result of {predetermined value (val2)−maximum value information (MV) corresponding to encrypted bitstream} to be encrypted data (Eval) corresponding to the encrypted bitstream.

Also, when the predetermined value (val2) corresponding to the encrypted bitstream is greater than the boundary-variable (limit) corresponding to the encrypted bitstream, the device 1000 may determine the predetermined value (val2) to be the encrypted data (Eval) corresponding to the encrypted bitstream.

For example, when the encrypted bitstream is "0001101", the device 1000 may obtain 13 as the predetermined value by performing binary inverse-conversion on "0001101". Also, the device 1000 may match 7, which is the bit size information of the encrypted bitstream ("0001101"), to the mapping table so that the device 1000 may obtain 64 as the boundary-variable corresponding to the encrypted bitstream ("0001101"). Also, the device 1000 may match 7, which is the bit size information of the encrypted bitstream ("0001101"), to the mapping table so that the device 1000 may obtain 127 as maximum value information corresponding to the encrypted bitstream ("0001101").

In this case, 13 that is the predetermined value is less than 64 that is the boundary-variable, thus, the device 1000 may obtain −114 (13−127=−114) as the encrypted data (Eval) corresponding to the encrypted bitstream ("0001101").

The device 1000 may encrypt each of coefficients included in an object to be encrypted and may perform entropy encoding after the encryption, so that the device 1000 may encrypt a multimedia bitstream while a codec characteristic that was previously applied to the multimedia bitstream is maintained.

Figure 8:
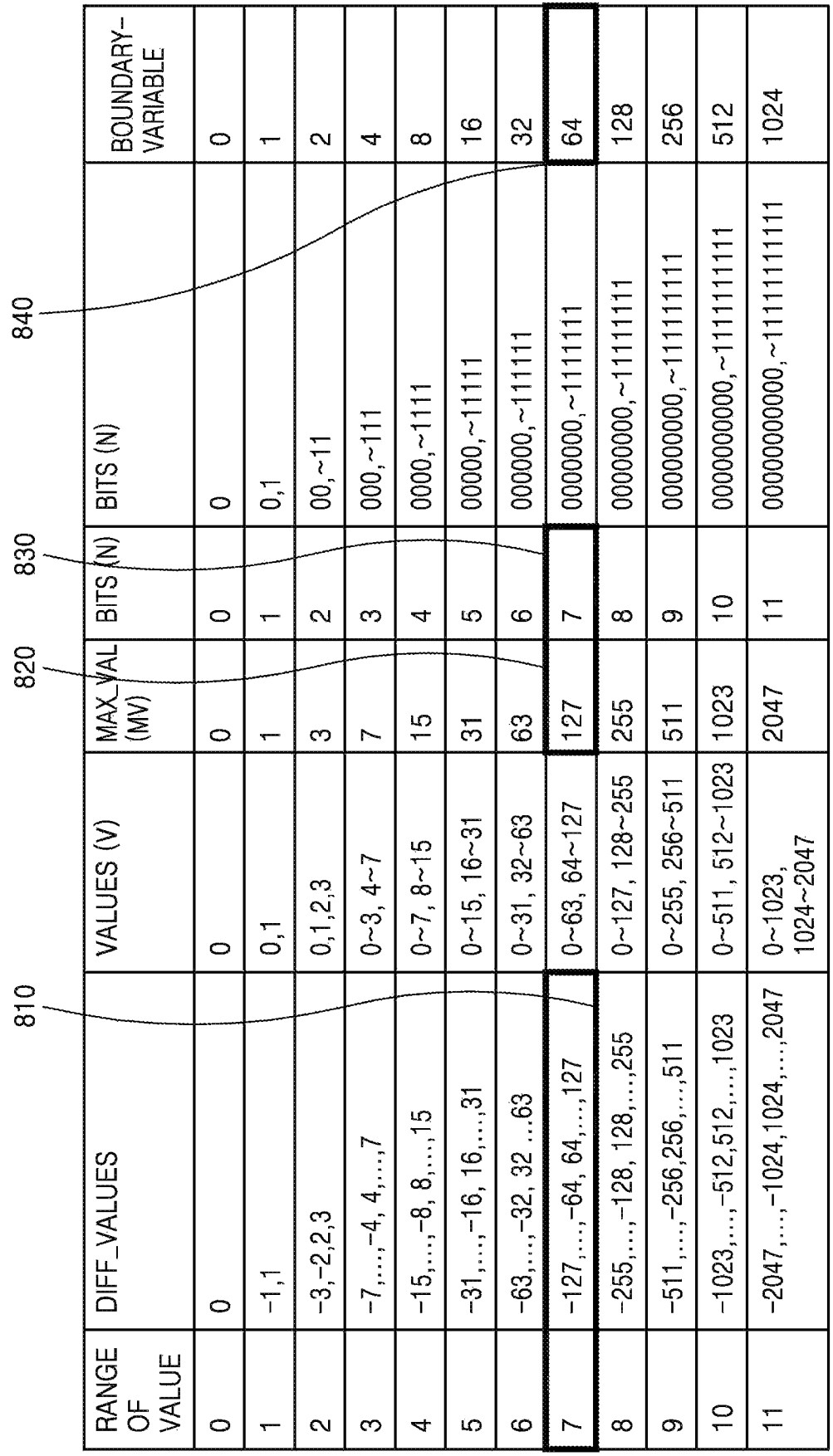
FIG. 8 is a diagram for describing a method of encrypting an object to be encrypted by using a preset mapping table, the method being performed by a device, according to some embodiments.

FIG. 8 is a diagram for describing a method of encrypting an object to be encrypted by using a preset mapping table, the method being performed by the device 1000, according to some embodiments.

According to some embodiments, the device 1000 may determine a range of a value of each of coefficients included in a selected object to be encrypted, based on a preset mapping table.

For example, the mapping table may classify the range of each of the coefficients as a $0^{th}$ range (0), a $1^{st}$ range (−1, 1), a $2^{nd}$ range (−3, −2, 2, 3), a $3^{rd}$ range (−7, . . . , −4, 4, . . . , 7), a $4^{th}$ range (−15, . . . , −8, 8, . . . , 15), a $5^{th}$ range (−31, . . . , −16, 16, . . . , 31), a $6^{th}$ range (−63, . . . , −32, 32, . . . 63), a $7^{th}$ range (−127, . . . , −64, 64, . . . , 127), an $8^{th}$ range (−255, . . . , −128, 128, . . . , 255), a $9^{th}$ range (−511, . . . , −256, 256, . . . , 511), a $10^{th}$ range (−1023, . . . , −512, 512, . . . , 1023), or a $11^{th}$ range (−2047, . . . , −1024, 1024, . . . , 2047). The device 1000 may determine the range of each of the coefficients to be one of the $0^{th}$ range through the $11^{th}$ range, based on the mapping table.

Referring to FIG. 8, when a value of a first coefficient from among the plurality of coefficients included in the object to be encrypted is −124, the device 1000 may obtain a range of the value of the first coefficient as the $7^{th}$ range 810, based on the mapping table.

The device 1000 may match respective determined ranges of the values of the coefficients to the preset mapping table, thereby obtaining respective maximum-value variables (MV) corresponding to the determined ranges.

Referring to FIG. 8, when a range of the value of the first coefficient included in the object to be encrypted is the $7^{th}$ range, the device 1000 may match the $7^{th}$ range to the preset mapping table, thereby obtaining 127 (see 820) as a maximum-value variable corresponding to the $7^{th}$ range.

The device 1000 may obtain predetermined values based on respective values of the coefficients included in the object to be encrypted and the respective maximum-value variables (MV) corresponding to the determined ranges of the values.

Referring to FIG. 8, when the value of the first coefficient from among the plurality of coefficients included in the object to be encrypted is −124, the device 1000 may determine the range of the value of the first coefficient to be the $7^{th}$ range 810, based on the mapping table. Also, the device 1000 may obtain, from the mapping table, 127 (see 820) as a maximum-value variable (Max_val) corresponding to the $7^{th}$ range 810.

Because −124 that is the first coefficient from among the plurality of coefficients included in the object to be encrypted is less than 0, the device 1000 may obtain the predetermined value (−124+127="3") corresponding to the first coefficient by adding 127 (see 820) that is the maximum-value variable (Max_val) to the value of the first coefficient.

According to some embodiments, the device 1000 may perform binary conversion on the obtained predetermined values. For example, the device 1000 may express the predetermined values as 0 or 1 by performing binary conversion on the predetermined values.

The device 1000 may determine bit size information of the obtained predetermined value. For example, the device 1000 may determine the bit size information, based on a range of a value of the object to be encrypted which corresponds to the obtained predetermined value.

Referring to FIG. 8, the device 1000 may map the $7^{th}$ range, which is the range of the value of the first coefficient, to the mapping table so that the device 1000 may obtain 7 (see 830) that is the bit size information of the predetermined value.

The device 1000 may perform binary conversion on the obtained predetermined value based on the bit size information.

Referring to FIG. 8, the device 1000 may perform binary conversion on the predetermined value (val=3) by using 7 bits. For example, the device 1000 may convert the predetermined value (val=3) into "0000011".

According to some embodiments, the device 1000 may apply an encryption process to a bitstream. For example, the device 1000 may encrypt the bitstream by using the encryption process that is applicable to the bitstream.

The encryption process that is applicable to the bitstream may include, but is not limited to, AES, Blowfish, DES, Serpent, Twofish, Camellia, CAST-128, IDEA, RC2, RC5, and SEED.

The device 1000 may encrypt the bitstream, thereby obtaining the encrypted bitstream.

For example, the device 1000 may encrypt the bitstream "0000011" obtained based on the predetermined value, thereby obtaining an encrypted bitstream "0001101".

According to some embodiments, the device 1000 may apply binary inverse-conversion to the encrypted bitstream, thereby obtaining a predetermined value.

For example, when the encrypted bitstream is "0001101", the device 1000 may obtain 13 as a predetermined value by performing binary inverse-conversion on "0001101".

The device 1000 may map bit size information of the encrypted bitstream to the mapping table, thereby obtaining various information corresponding to the encrypted bitstream.

Referring to FIG. 8, the device 1000 may map the bit size information of the encrypted bitstream to the mapping table, thereby obtaining a boundary-variable 840 of the encrypted bitstream. For example, the device 1000 may match 7, which is the bit size information of the encrypted bitstream ("0001101"), to the mapping table so that the device 1000 may obtain 64 as the boundary-variable 840 corresponding to the encrypted bitstream ("0001101").

Also, the device 1000 may match the bit size information of the encrypted bitstream to the mapping table, thereby obtaining a maximum-value variable (MV) of encrypted data corresponding to the encrypted bitstream. The maximum-value variable (MV) means a maximum value that may be included in a range of a value including the encrypted data.

Referring to FIG. 8, the device 1000 may match 7, which is the bit size information of the encrypted bitstream ("0001101"), to the mapping table so that the device 1000 may obtain 127 (see 820) as the maximum-value variable (MV).

According to some embodiments, the device 1000 may obtain the encrypted data corresponding to the encrypted bitstream by using a predetermined value corresponding to the encrypted bitstream, a boundary-variable corresponding to the encrypted bitstream, and a maximum-value variable (MV) corresponding to the encrypted bitstream.

For example, when the predetermined value (val2) corresponding to the encrypted bitstream is less than the boundary-variable (limit) corresponding to the encrypted bitstream, the device 1000 may determine a result of {predetermined value (val2)−maximum value information (MV) corresponding to encrypted bitstream} to be the encrypted data (Eval) corresponding to the encrypted bitstream.

Also, when the predetermined value (val2) corresponding to the encrypted bitstream is greater than the boundary-variable (limit) corresponding to the encrypted bitstream, the device 1000 may determine the predetermined value (val2) to be the encrypted data (Eval).

Referring to FIG. 8, when the encrypted bitstream is "0001101", the device 1000 may obtain 13 as the predetermined value by performing binary inverse-conversion on "0001101". Also, the device 1000 may match 7 (see 830), which is the bit size information of the encrypted bitstream ("0001101"), to the mapping table so that the device 1000 may obtain 64 as the boundary-variable 840 corresponding to the encrypted bitstream ("0001101"). Also, the device 1000 may match 7 (see 830), which is the bit size information of the encrypted bitstream ("0001101"), to the mapping table so that the device 1000 may obtain 127 (see 820) as maximum value information corresponding to the encrypted bitstream ("0001101").

In this case, 13 that is the predetermined value is less than 64 that is the boundary-variable 840, thus, the device 1000 may obtain "−114(13−127=−114)" as the encrypted data (Eval) corresponding to the encrypted bitstream ("0001101").

Figure 9:
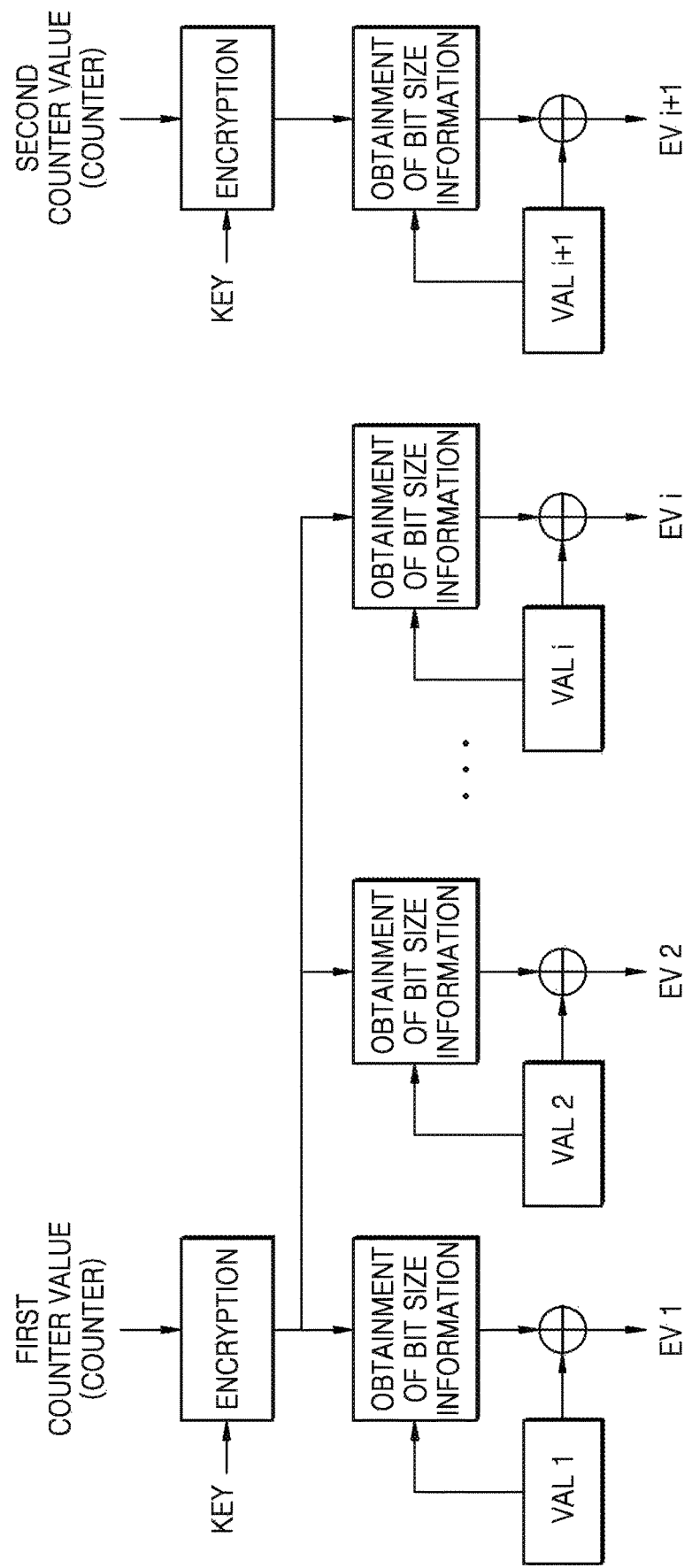
FIG. 9 is a diagram for describing a method of encrypting a bitstream by applying 128 bit AES CTR to the bitstream, the method being performed by the device, according to some embodiments.

FIG. 9 is a diagram for describing a method of encrypting a bitstream by applying 128 bit AES CTR to the bitstream, the method being performed by the device 1000, according to some embodiments.

According to some embodiments, the device 1000 may use an AES method so as to encrypt an object to be encrypted.

The AES method usable by the device 1000 may include various modes. For example, the AES method may include, but is not limited to, ECB, CBC, PCBC, CFB, OFB, CTR modes, or the like.

The device 1000 may encrypt an object to be encrypted by using the CTR mode. For example, the device 1000 may encrypt the object to be encrypted by encrypting a counter value and then performing an XOR operation on the encrypted counter value and the object to be encrypted.

The device 1000 may use various counter values. For example, the device 1000 may use, but is not limited to, a counter value of 128 bits, a counter value of 196 bits, or a counter value of 256 bits.

According to some embodiments, the device 1000 may convert an object to be encrypted from among processed multimedia data into a bitstream, and may apply an AES CTR_128 bits mode to the converted bitstream, so that the device 1000 may encrypt the bitstream. The AES CTR_128 bits mode means an AES CTR mode using a counter value of 128 bits.

The device 1000 may encrypt the counter value of 128 bits. For example, the device 1000 may encrypt the counter value by using an encryption key but the present disclosure is not limited thereto.

The device 1000 may encrypt the converted bitstream by performing an XOR operation on the converted bitstream and the encrypted counter value.

Referring to FIG. 9, the device 1000 may obtain an encrypted bitstream EV 1 of a first coefficient Val 1 by performing an XOR operation on the encrypted counter and a bitstream converted from the first coefficient Val 1 from among the object to be encrypted.

Also, the device 1000 may obtain an encrypted bitstream EV 2 of a second coefficient Val 2 by performing an XOR operation on the encrypted counter and a bitstream converted from the second coefficient Val 2 from among the object to be encrypted.

According to some embodiments, when the device 1000 performs encryption by using the CTR mode, the device 1000 may obtain bit size information of a bitstream, and may use the obtained bit size information of the bitstream.

For example, when the device 1000 encrypts a current bitstream by using an encrypted first counter value, if a total sum of a bit size of the current bitstream and a sum of bit sizes of bitstreams that were encrypted, prior to the current bitstream, by using the first counter value is greater than 128, the device 1000 may encrypt the current bitstream by using an encrypted second counter value.

For example, when the device 1000 encrypts the current bitstream by using the encrypted second counter value, if a total sum of the bit size of the current bitstream and a sum of bit sizes of bitstreams that were encrypted, prior to the current bitstream, by using the second counter value is greater than 128, the device 1000 may encrypt the current bitstream by using an encrypted third counter value.

Referring to FIG. 9, when a current bitstream Val_i+1 is encrypted by using a first counter value, if a total sum of a bit size of the current bitstream Val_i+1 and a sum of bit sizes of bitstreams Val_1, Val_2, . . . , Val_i that were encrypted, prior to the current bitstream, by using the first counter value is greater than 128, the device 1000 may encrypt the current bitstream Val_i+1 by using an encrypted second counter value.

According to some embodiments, the device 1000 may apply the AES CTR_128 bits method by using bit size information, thereby minimizing a process of encrypting a counter value. Also, the device 1000 may decrease an operation of an encryption process by minimizing the process of encrypting a counter value.

Figure 10:
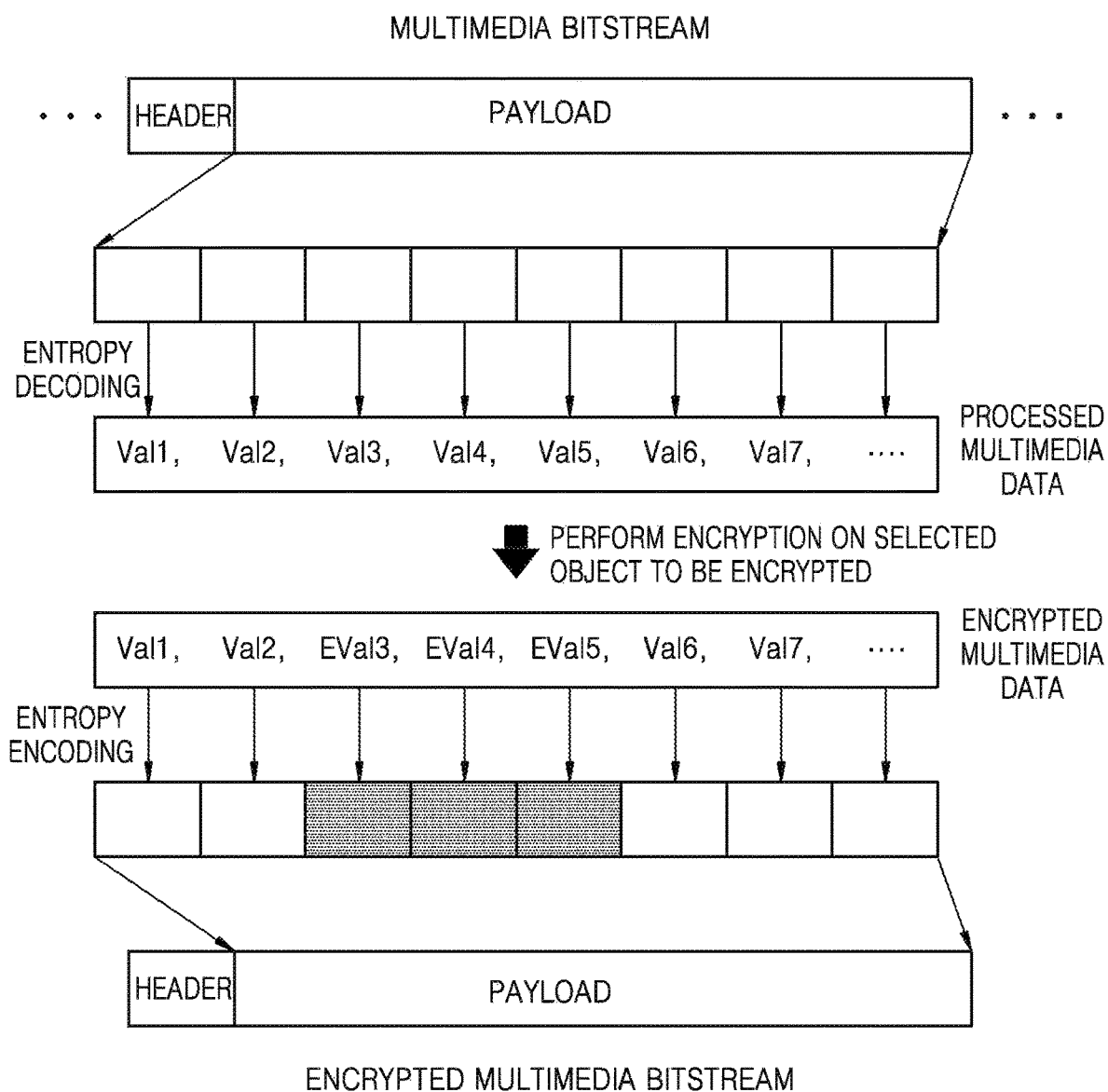
FIG. 10 is a diagram for describing a method of encrypting some of a multimedia bitstream, according to some embodiments.

FIG. 10 is a diagram for describing a method of encrypting some of a multimedia bitstream, according to some embodiments.

The device 1000 may obtain a multimedia bitstream. For example, the device 1000 may receive the multimedia bitstream from an external device, or may obtain the multimedia bitstream by encoding multimedia data.

The multimedia bitstream may include a plurality of bit groups. Also, the plurality of bit groups may each include a header region and a payload region.

The device 1000 may perform entropy decoding on the multimedia bitstream, thereby obtaining processed multimedia data. The processed multimedia data may include a plurality of parameters (Val1, Val2, Val3, Val4, Val5, Val6, . . . ).

The device 1000 may select an object to be encrypted from among the processed multimedia data. For example, the device 1000 may select, as the object to be encrypted, some of the plurality of parameters (Val1, Val2, Val3, Val4, Val5, Val6, . . . ) included in the processed multimedia data. Also, the device 1000 may select, as the object to be encrypted, all of the plurality of parameters (Val1, Val2, Val3, Val4, Val5, Val6, . . . ) included in the processed multimedia data.

Referring to FIG. 10, the device 1000 may select, as the object to be encrypted, some parameters Val3, Val4, and Val5 from among the plurality of parameters included in the processed multimedia data.

The device 1000 may encrypt the selected object to be encrypted. For example, the device 1000 may not convert the selected object to be encrypted into a bitstream but may directly encrypt the selected object to be encrypted. Also, the device 1000 may convert the selected object to be encrypted into the bitstream, may encrypt the bitstream, and may convert the encrypted bitstream into data, thereby obtaining encrypted data.

The device 1000 may encrypt the object to be encrypted, thereby converting the processed multimedia data into encrypted multimedia data.

For example, the device 1000 may encrypt the parameters Val3, Val4, and Val5 selected from among the plurality of parameters Val1, Val2, Val3, Val4, Val5, Val6, and the like included in the processed multimedia data, thereby obtaining the encrypted multimedia data including encrypted data EVal3, EVal4, and EVal5.

The device 1000 may generate an encrypted multimedia bitstream by encoding the encrypted multimedia data.

Encoding may include entropy encoding. The entropy encoding refers to a method of converting data into a bitstream. For example, the device 1000 may convert the encrypted multimedia data into a combination of 1 and 0 by using the entropy encoding.

The entropy decoding may include, but is not limited to, Huffman coding, arithmetic transformation coding, fixed length coding, CAVLC, CABAC, or the like.

Figure 11:
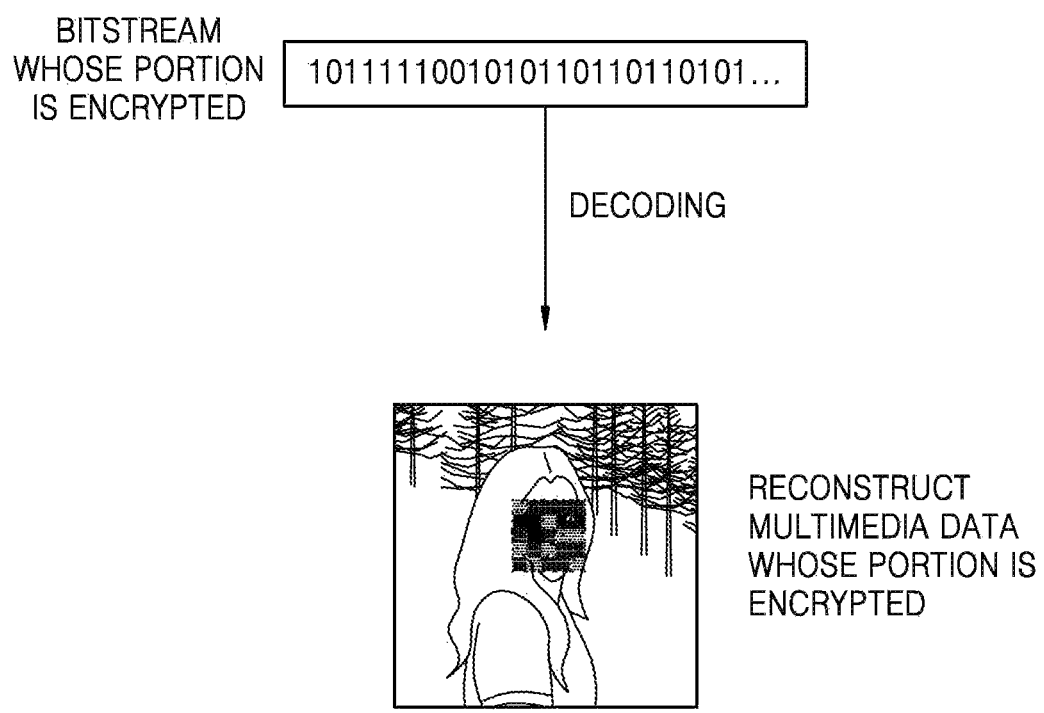
FIG. 11 is a diagram of an expression of a multimedia bitstream whose portion is encrypted, according to an embodiment.

FIG. 11 is a diagram of an expression of a multimedia bitstream whose portion is encrypted, according to an embodiment.

According to some embodiments, the device 1000 may select an object to be encrypted.

For example, the device 1000 may select, as the object to be encrypted, some of processed multimedia data. Alternatively, the device 1000 may select, as the object to be encrypted, an entire portion of the processed multimedia data.

For example, the device 1000 may obtain processed picture data by processing picture data consisting of a plurality of blocks, and may select, as the object to be encrypted, data indicating a first block from the processed picture data.

The device 1000 may select the object to be encrypted based on a preset criterion. For example, in a case where a person included in the picture data is preset as the object to be encrypted, the device 1000 may process the picture data, and may select, as the object to be encrypted, data indicating the person from among the processed picture data.

Also, the device 1000 may select the object to be encrypted based on a user input. For example, in a case where a user inputs, as the object to be encrypted, a person included in the picture data, the device 1000 may process the picture data, and may select, as the object to be encrypted, data indicating the person from among the processed picture data.

According to some embodiments, the device 1000 may select, as the object to be encrypted, a person included in the picture data. Also, the device 1000 may encrypt data indicating the person included in the picture data, thereby obtaining a picture bitstream whose portion is encrypted. In this case, the device 1000 may encrypt the object to be encrypted, prior to entropy encoding.

An existing decoding device may decode an encrypted multimedia bitstream. For example, the existing decoding device may decode the encrypted multimedia bitstream, thereby obtaining multimedia data whose portion is encrypted. Also, the existing decoding device may display the multimedia data whose portion is encrypted.

Figure 12:
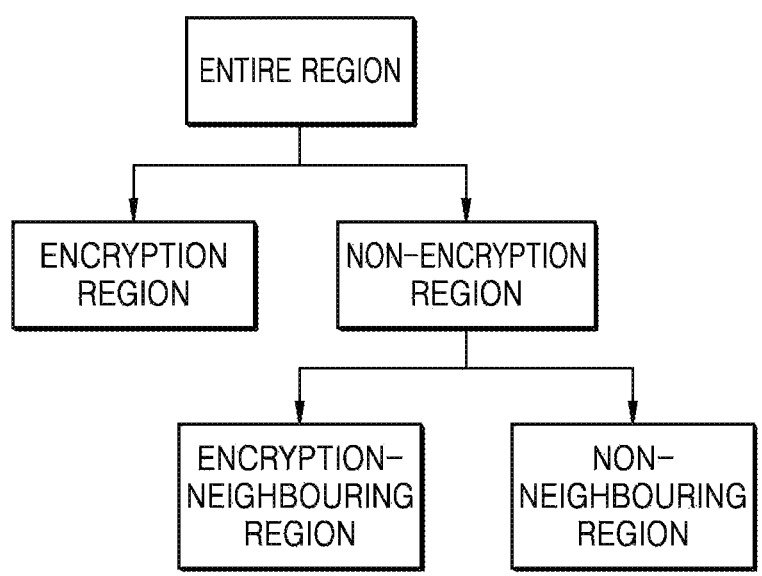
FIG. 12 is a diagram for describing encryption compensation, according to some embodiments.

FIG. 12 is a diagram for describing encryption compensation, according to some embodiments.

According to some embodiments, the device 1000 may divide multimedia data into a plurality of regions. For example, the device 1000 may divide an entire region of the multimedia data into an encryption region and a non-encryption region.

The device 1000 may select the encryption region of the multimedia data, based on a user input. Alternatively, the device 1000 may select the encryption region of the multimedia data, based on a preset criterion. For example, when a person included in picture data is previously set as an object to be encrypted, the device 1000 may select, as the object to be encrypted, data indicating the person from the picture data.

The device 1000 may divide the non-encryption region of the multimedia data into an encryption-neighbouring region and a non-neighbouring region. The encryption-neighbouring region indicates a region in which the device 1000 uses data included in the encryption region so as to encode the multimedia data. The non-neighbouring region indicates a region of the non-encryption region excluding the encryption-neighbouring region.

For example, when the device 1000 applies a codec to and encodes picture data including a plurality of blocks, a second block included in the picture data and a non-encryption region may refer to data of a first region included in an encryption region. In this case, the device 1000 may classify the second block as an encryption-neighbouring region.

According to some embodiments, when the device 1000 encrypts the encryption region of the multimedia data, the device 1000 may perform encryption by using the methods described above with reference to FIGS. 2 through 10.

For example, the device 1000 may perform encryption on the encryption region of the multimedia data and may not perform encryption on the non-neighbouring region of the non-encryption region, such that the device 1000 may convert the multimedia data into encrypted multimedia data.

According to some embodiments, when the device 1000 encrypts the multimedia data including the encryption-neighbouring region, the device 1000 may perform encryption compensation on the encryption-neighbouring region.

The encryption compensation indicates a process of compensating for data of the encryption-neighbouring region when the device 1000 encrypts the object to be encrypted.

For example, when the device 1000 encrypts the encryption region included in the multimedia data, data of the encryption region is converted such that an error may occur in the data of the encryption-neighbouring region which refers to the encryption region. In order to prevent the occurrence of the error with respect to the encryption-neighbouring region, the device 1000 may perform the encryption compensation on the data of the encryption-neighbouring region.

Figure 13:
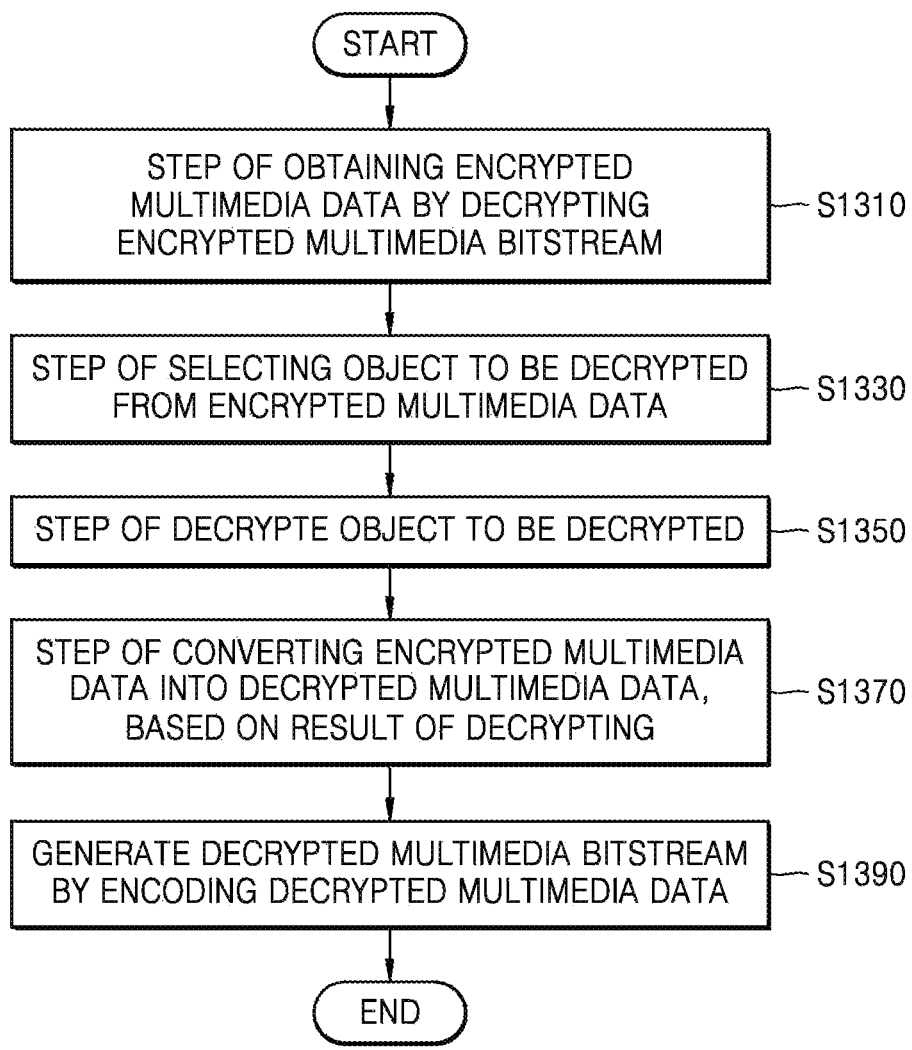
FIG. 13 is a diagram for describing a method of decrypting decrypting an encrypted bitstream, according to some embodiments.

FIG. 13 is a diagram for describing a method of decrypting an encrypted bitstream, according to some embodiments.

In operation S1310, the device 1000 may obtain encrypted multimedia data by decoding an encrypted multimedia bitstream.

According to some embodiments, the device 1000 may obtain the encrypted multimedia bitstream. For example, the device 1000 may generate the encrypted multimedia bitstream or may receive the encrypted multimedia bitstream from an external device.

Also, the device 1000 may obtain an encrypted meta bitstream. For example, the device 1000 may generate the encrypted meta bitstream or may receive the encrypted meta bitstream from an external device.

The device 1000 may obtain the encrypted multimedia data from the encrypted multimedia bitstream. Also, the device 1000 may obtain encrypted metadata from the encrypted meta bitstream.

For example, the device 1000 may obtain the encrypted multimedia data by performing entropy decoding on the encrypted multimedia bitstream. Entropy decoding indicates a coding method of converting a bitstream into data corresponding to the bitstream. Entropy decoding may include, but is not limited to, Huffman coding, arithmetic transformation coding, run-length coding, CAVLC, CABAC, or the like.

In operation S1330, the device 1000 may select an object to be decrypted from the encrypted multimedia data.

According to some embodiments, the device 1000 may select the object to be decrypted.

For example, the device 1000 may search for an encrypted portion by analyzing the encrypted multimedia data, and may select the object to be decrypted from the encrypted portion. Also, the device 1000 may search for the encrypted portion by analyzing the encrypted metadata, and may select the object to be decrypted from the encrypted portion.

For example, the device 1000 may obtain picture data in which a first block and a second block are encrypted. The device 1000 may search of portions indicating the encrypted first block and second block in the picture data, and may select an object to be decrypted from among the portion indicating the first block and the portion indicating the second block.

According to some embodiments, the device 1000 may select, as the object to be decrypted, all of encrypted portions of the encrypted multimedia data, or may select some of the encrypted portions as the object to be decrypted. For example, the device 1000 may select, as the object to be decrypted, all or some of the encrypted portions of the encrypted multimedia data, based on a preset criterion or a user input.

In operation S1350, the device 1000 may decrypt the selected object to be decrypted.

According to some embodiments, the device 1000 may decrypt the selected object to be decrypted. For example, the device 1000 may decrypt the object to be decrypted by using a decrypting process corresponding to an encryption process used in encrypting the object to be decrypted.

According to some embodiments, the device 1000 may not convert the selected object to be decrypted into a bitstream but may directly decrypt the selected object to be decrypted.

For example, the device 1000 may decrypt the object to be decrypted by applying a predetermined function to values of parameters included in the object to be decrypted.

As another example, the device 1000 may decrypt the object to be decrypted by exchanging parameters of a first block included in the object to be decrypted with parameters of a second block, base on a preset rule.

Also, the device 1000 may decrypt the object to be decrypted by changing a sign of the values of the parameters included in the object to be decrypted.

Also, the device 1000 may decrypt the object to be decrypted by changing a sign of the parameters included in the processed multimedia data by using a preset decrypting key.

According to another embodiment, the device 1000 may convert the selected object to be decrypted into the bitstream, may decrypt the bitstream, and may convert the decrypted bitstream into data, thereby decrypting the object to be decrypted.

The device 1000 may convert the selected object to be decrypted from among the encrypted multimedia data into the bitstream.

For example, the device 1000 may map the object to be decrypted to a preset mapping table, thereby obtaining predetermined values corresponding to the object to be decrypted. Also, the device 1000 may perform binary conversion on the obtained predetermined values, thereby obtaining the bitstream corresponding to the object to be decrypted.

When the device 1000 performs binary conversion, the device 1000 may perform binary conversion based on bit size information of each of the predetermined values.

The device 1000 may decrypt the obtained bitstream. For example, the device 1000 may decrypt the obtained bitstream by using a decrypting method applicable to the bitstream. The decrypting method applicable to the bitstream may include, but is not limited to, AES, Blowfish, DES, Serpent, Twofish, Camellia, CAST-128, IDEA, RC2, RC5, and SEED.

The device 1000 may convert the decrypted bitstream into data, thereby obtaining decrypted data. For example, the device 1000 may obtain the predetermined values by performing binary inverse-conversion on the decrypted bitstream, and may obtain the decrypted data by mapping the predetermined values to the preset mapping table.

According to some embodiments, the device 1000 may limit the decrypted data. For example, when values of the decrypted data exceed values of data which are allowed by an existing decoding device, the device 1000 may correct the values of the decrypted data to the values that are allowed by the existing decoding device.

In operation S1370, the device 1000 may convert the encrypted multimedia data into decrypted multimedia data, based on a result of the decrypting.

According to some embodiments, the device 1000 may obtain the decrypted data by decrypting the object to be decrypted. Also, the device 1000 may convert the encrypted multimedia data into the decrypted multimedia data by converting the object to be decrypted of the encrypted multimedia data into the decrypted data. Also, the device 1000 may convert the encrypted metadata into the decrypted metadata by converting the object to be decrypted of the encrypted metadata into the decrypted data.

For example, when the selected object to be decrypted is a first block of picture data consisting of a plurality of blocks, the device 1000 may obtain decrypted data by decrypting data indicating the first block. The device 1000 may obtain decrypted picture data by converting the data indicating the first block of encrypted picture data into the decrypted data.

In operation S1390, the device 1000 may generate a decrypted multimedia bitstream by encoding the decrypted multimedia data.

The device 1000 may generate the decrypted multimedia bitstream by encoding the decrypted multimedia data. Also, the device 1000 may generate a decrypted meta bitstream by encoding the decrypted metadata.

For example, when the device 1000 selects, as the object to be decrypted, the data indicating the person in the encrypted picture data, the device 1000 may generate decrypted picture data by converting the data indicating the person in the encrypted picture data into the decrypted data, and may generate a decrypted picture bitstream by encoding the decrypted picture data.

Encoding may include entropy encoding. Entropy encoding may convert data into a bitstream. For example, the device 1000 may convert the decrypted multimedia data into a combination of 1 and 0 by using entropy encoding.

The entropy encoding may include, but is not limited to, Huffman coding, arithmetic transformation coding, run-length coding, CAVLC, CABAC, or the like.

Figure 14:
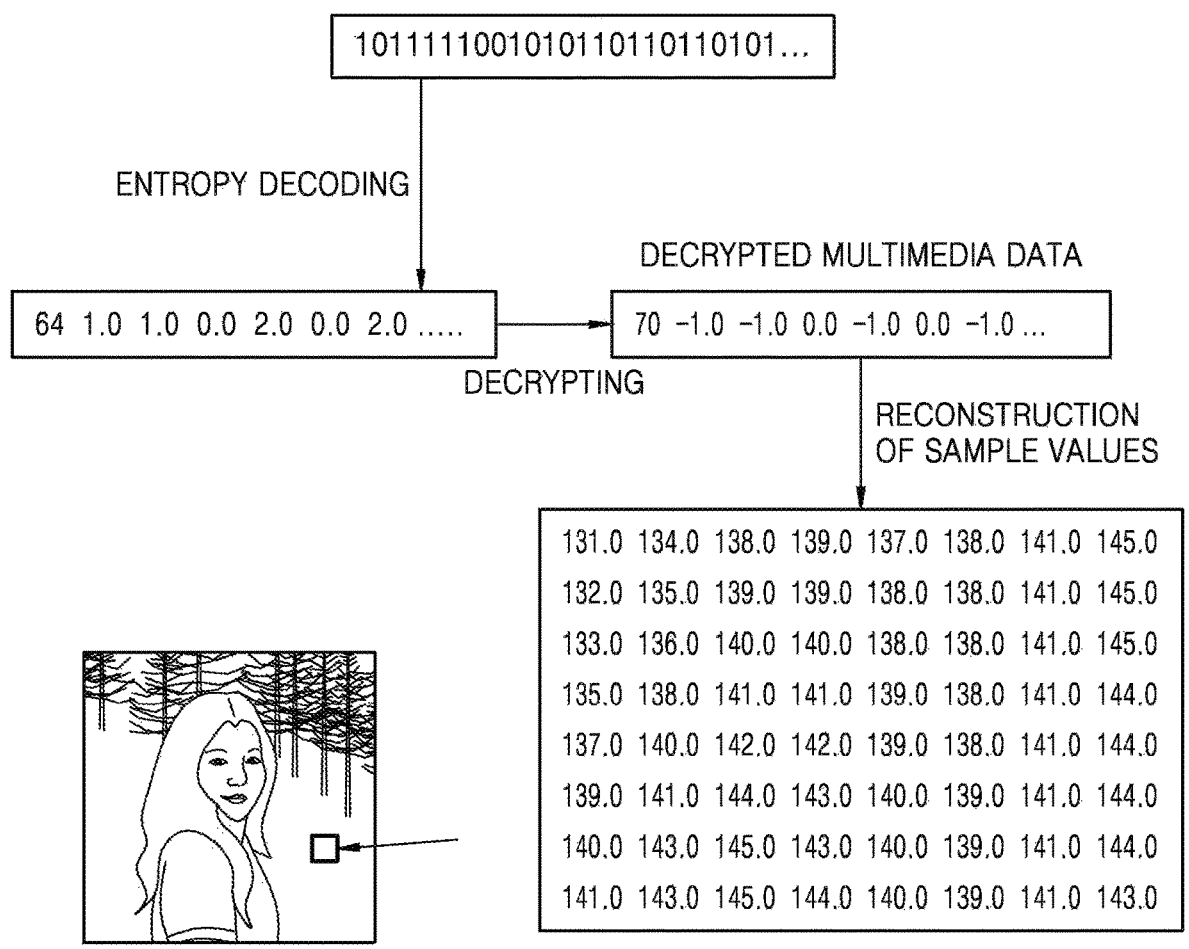
FIG. 14 is a diagram for describing a method of decrypting decrypting an decrypting object to be decrypted and reconstructing an image, according to some embodiments.

FIG. 14 is a diagram for describing a method of decrypting a object to be decrypted and reconstructing an image, according to some embodiments.

The device 1000 may obtain an encrypted multimedia bitstream. Also, the device 1000 may obtain an encrypted meta bitstream. For example, the device 1000 may receive the encrypted multimedia bitstream from an external device, or may generate the encrypted multimedia bitstream.

The device 1000 may perform entropy decoding on the encrypted multimedia bitstream, thereby obtaining encrypted multimedia data. The encrypted multimedia data may include a plurality of parameters 64, 1, 1, 0, 2, and the like.

The device 1000 may select, as the object to be decrypted, from among the obtaining encrypted multimedia data. For example, the device 1000 may search for encrypted portions from among the plurality of parameters 64, 1, 1, 0, 2, and the like included in the encrypted multimedia data, and may select the object to be decrypted from among searched portions.

The device 1000 may select, as the object to be decrypted, all of encrypted portions from among the encrypted multimedia data, or may select some of the encrypted portions as the object to be decrypted. Also, the device 1000 may select, as the object to be decrypted, all or some of the encrypted portions from among the encrypted multimedia data, based on a preset criterion or a user input.

The device 1000 may convert the object to be decrypted into decrypted data by decrypting the selected object to be decrypted. For example, the device 1000 may obtain decrypted data (70, −1, −1, 0, −1, and the like) by decrypting encrypted data (64, 1, 1, 0, 1, and the like) included in the encrypted multimedia data.

According to some embodiments, the device 1000 may decrypt the object to be decrypted by using a decrypting process corresponding to an encryption process used in encrypting the object to be decrypted.

According to some embodiments, the device 1000 may not convert the selected object to be decrypted to a bitstream but may directly decrypt the selected object to be decrypted.

According to another embodiment, the device 1000 may convert the object to be decrypted (64, 1, 1, 0, 1, and the like) into a bitstream, may decrypt the bitstream, and may convert the decrypted bitstream into data, thereby converting the object to be decrypted into the decrypted data (70, −1, −1, 0, −1, and the like).

The device 1000 may convert the encrypted multimedia data into decrypted multimedia data, based on the decrypted data, and may restore sample values by using the decrypted multimedia data, thereby reconstructing an image.

Figure 15:
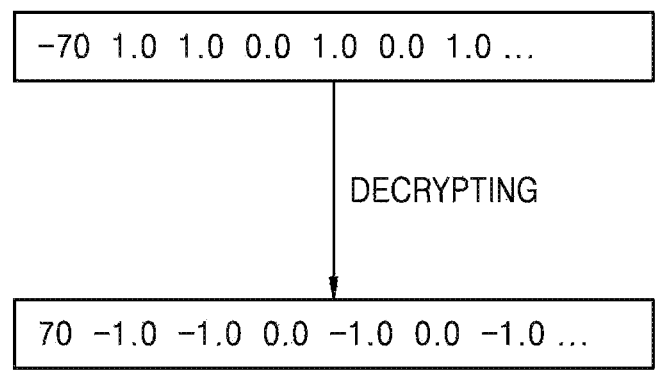
FIG. 15 is a diagram for describing a method of directly decrypting decrypting an decrypting object to be decrypted without converting the decrypting object to be decrypted into a bitstream, according to some embodiments.

FIG. 15 is a diagram for describing a method of directly decrypting a object to be decrypted without converting the object to be decrypted into a bitstream, according to some embodiments.

According to some embodiments, the device 1000 may not directly convert a object to be decrypted into a bitstream but may directly decrypt the object to be decrypted.

For example, when the object to be decrypted is a plurality of parameters, the device 1000 may directly decrypt the parameters. Referring to FIG. 15, the device 1000 may change a sign of each of the plurality of parameters that are the object to be decrypted, thereby decrypting the plurality of parameters that are the object to be decrypted.

Also, for example, the device 1000 may change, by using a preset decrypting key, a sign of each of the plurality of parameters that are the object to be decrypted, thereby decrypting the plurality of parameters that are the object to be decrypted.

Also, for example, when the object to be decrypted is a plurality of parameters indicating a first block, the device 1000 may decrypt the plurality of parameters that are the object to be decrypted by exchanging the plurality of parameters indicating the first block with parameters of another block, base on a preset rule.

Also, for example, when the object to be decrypted is the plurality of parameters indicating the first block, the device 1000 may decrypt the plurality of parameters that are the object to be decrypted by scrambling the plurality of parameters indicating the first block with parameters of another block.

Also, for example, the device 1000 may decrypt the plurality of parameters that are the object to be decrypted, by applying a specific function to and changing the plurality of parameters that are the object to be decrypted.

Figure 16:
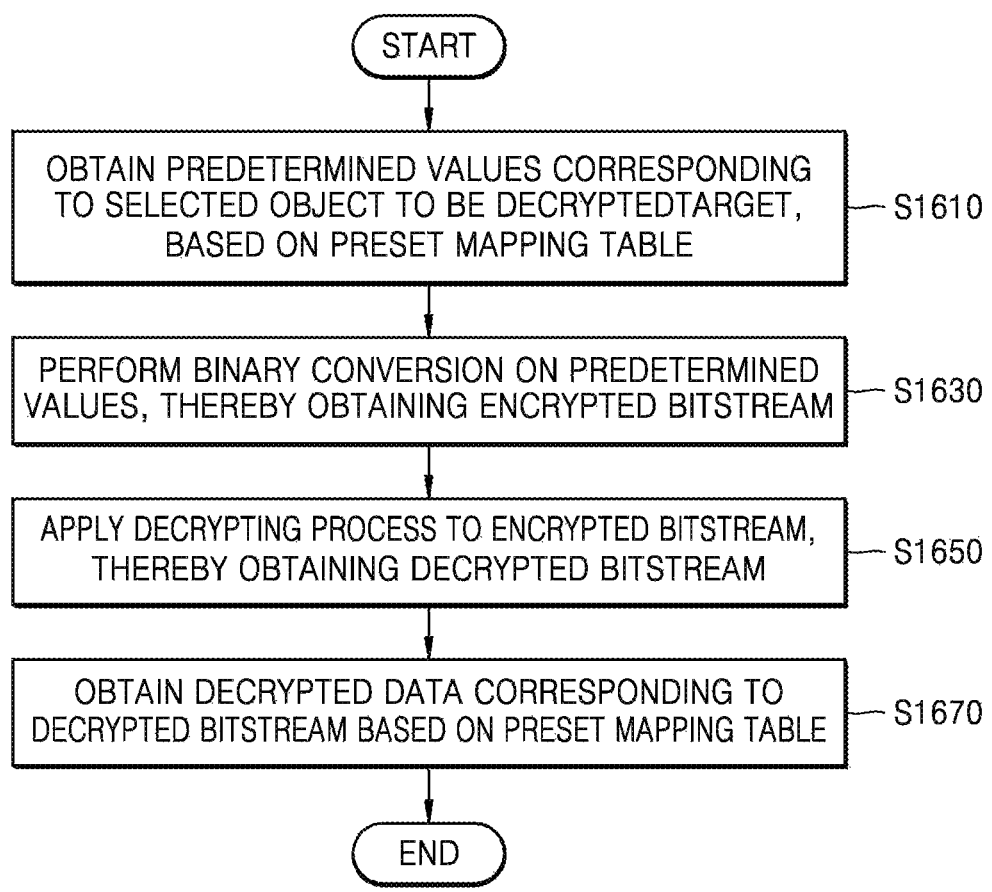
FIG. 16 is a diagram for describing a method of converting an decrypting object to be decrypted into a bitstream and directly decrypting decrypting the converted bitstream, according to some embodiments.

FIG. 16 is a diagram for describing a method of converting a object to be decrypted into a bitstream and directly decrypting the converted bitstream, according to some embodiments.

According to some embodiments, the device 1000 may convert a selected object to be decrypted into a bitstream, may decrypt the converted bitstream, and may convert the decrypted bitstream into data, thereby decrypting the object to be decrypted.

In operation S1610, the device 1000 may obtain predetermined values corresponding to a selected object to be decrypted, based on a preset mapping table.

According to some embodiments, the object to be decrypted selected by the device 1000 may include a plurality of coefficients. For example, the object to be decrypted selected by the device 1000 may include the plurality of coefficients each having one of values greater than −1023 and less than 1023.

According to some embodiments, the device 1000 may determine a range of a value of each of the coefficients included in the selected object to be decrypted, based on the mapping table.

For example, the mapping table may classify the range of each of the coefficients as a $0^{th}$ range (0), a $1^{st}$ range (−1, 1), a $2^{nd}$ range (−3, −2, 2, 3), a $3^{rd}$ range (−7, . . . −4, 4, . . . , 7), a $4^{th}$ range (−15, . . . , −8, 8, . . . , 15), a $5^{th}$ range (−31, . . . , −16, 16, . . . , 31), a $6^{th}$ range (−63, . . . , −32, 32, . . . , 63), a $7^{th}$ range (−127, . . . , −64, 64, . . . , 127), an $8^{th}$ range (−255, . . . , −128, 128, . . . , 255), a $9^{th}$ range (−511, . . . , −256, 256, . . . , 511), a $10^{th}$ range (−1023, . . . , −512, 512, . . . , 1023), or an $11^{th}$ range (−2047, . . . , −1024, 1024, . . . , 2047). The device 1000 may determine the range of each of the coefficients to be one of the $0^{th}$ range through the $11^{th}$ range, based on the mapping table.

The device 1000 may change the mapping table whenever the device 1000 performs decrypting, the mapping table being a reference of the range of the value of each of the coefficients included in the object to be decrypted. Alternatively, the device 1000 may determine the range of the value of each of the coefficients included in the object to be decrypted by consistently using the same mapping table.

The device 1000 may generate, change, or delete the mapping table, based on a user input. Also, the device 1000 may receive the mapping table from an external device, or may use a pre-stored mapping table.

The mapping table stored in the device 1000 may include various variables respectively corresponding to ranges included in the mapping table. For example, the mapping table stored in the device 1000 may include a maximum-value variable (MV). The maximum-value variable (MV) means a maximum value that may be included in each of divided regions.

For example, the mapping table stored in the device 1000 may include 0 as a maximum-value variable (MV) of a zeroth region, 1 as a maximum-value variable of a first region, and 3 as a maximum-value variable of a second region.

The device 1000 may match respective determined ranges of the values of the coefficients to the mapping table, thereby obtaining respective maximum-value variables (MV) corresponding to the determined ranges.

For example, when a range of a value of a first coefficient included in a object to be decrypted corresponds to a $0^{th}$ range, the device 1000 may match the $0^{th}$ range to the mapping table, thereby obtaining 0 that is a maximum-value variable corresponding to the $0^{th}$ range.

As another example, when the range of the value of the first coefficient included in the object to be decrypted corresponds to a $1^{st}$ range, the device 1000 may match the $1^{st}$ range to the mapping table, thereby obtaining 1 that is a maximum-value variable corresponding to the $1^{st}$ range.

As another example, when a range of a value of a second coefficient included in the object to be decrypted corresponds to a $2^{nd}$ range, the device 1000 may match the $2^{nd}$ range to the mapping table, thereby obtaining 3 that is a maximum-value variable corresponding to the $2^{nd}$ range.

The device 1000 may obtain a predetermined value, based on respective values of coefficients included in an obtained object to be encrypted, and maximum-value variables (MV)

corresponding to determined ranges of the values of the coefficients included in the obtained object to be decrypted.

$$If(E\_val<0)\{val=E\_val+MV\}$$
$$else \{val=E\_val\} \quad \text{[Equation 3]}$$

For example, the device 1000 may obtain a predetermined value by using Equation 3. E_val indicates a value of a coefficient included in the object to be decrypted, val indicates a predetermined value, and MV indicates maximum-value variables corresponding to the respective determined ranges of the values of the coefficients.

For example, when a value (E_val) of a first coefficient from among a plurality of coefficients included in a object to be decrypted is less than 0, the device 1000 may obtain a result of {value (E_val) of first coefficient+maximum-value variable (MV)} as the predetermined value (val) corresponding to the first coefficient.

Also, when the value of the first coefficient from among the plurality of coefficients included in the object to be decrypted is greater than 0, the device 1000 may obtain the value (E_val) of the first coefficient as the predetermined value (val) corresponding to the value of the first coefficient.

For example, when the value of the first coefficient from among the plurality of coefficients included in the object to be decrypted is −114, the device 1000 may obtain a range of the value of the first coefficient as the $7^{th}$ range (−127, . . . , −64, 64, . . . , 127), based on the mapping table. Also, the device 1000 may obtain, from the mapping table, 127 that is a maximum-value variable (MV) corresponding to the $7^{th}$ range.

The device 1000 may apply −114 that is the first coefficient to Equation 3. By applying the first coefficient to Equation 3, the device 1000 may obtain (val=13) as a predetermined value.

In operation S1630, the device 1000 may perform binary conversion on the predetermined values, thereby obtaining a bitstream.

According to some embodiments, the device 1000 may perform binary conversion on the obtained predetermined values. For example, the device 1000 may express the obtained predetermined values as 0 or 1 by performing binary conversion on the obtained predetermined values.

The device 1000 may determine bit size information of an obtained predetermined value. For example, the device 1000 may determine the bit size information, based on a range of a value of a object to be decrypted which corresponds to the obtained predetermined value.

For example, when the value of the first coefficient from among the plurality of coefficients included in the object to be decrypted is −114, the device 1000 may obtain the range of the value of the first coefficient as the $7^{th}$ range (−127, . . . , −64, 64, . . . , 127), based on the mapping table, and may obtain a predetermined value (val=13) corresponding to the first coefficient.

Also, the device 1000 may obtain bit size information of the obtained predetermined value (val=13), based on the range of the value of the first coefficient corresponding to the predetermined value.

For example, the device 1000 may map the $7^{th}$ range, which is the range of the value of the first coefficient, to the mapping table so that the device 1000 may obtain 7 that is the bit size information of the predetermined value.

The device 1000 may perform binary conversion on the obtained predetermined value, based on the bit size information.

For example, the device 1000 may perform binary conversion on the predetermined value (val=13) by using 7 bits. For example, the device 1000 may convert the predetermined value (val=13) into "0001101".

In operation S1650, the device 1000 may apply a decrypting process to the bitstream, thereby obtaining a decrypted bitstream.

According to some embodiments, the device 1000 may apply the decrypting process to the bitstream. For example, the device 1000 may decode the bitstream by using the decrypting process that is applicable to the bitstream. Also, the device 1000 may decode the object to be decrypted by using the decrypting process corresponding to an encryption process used in encrypting the object to be decrypted.

The decrypting process that is applicable to the bitstream may include, but is not limited to, AES, Blowfish, DES, Serpent, Twofish, Camellia, CAST-128, IDEA, RC2, RC5, and SEED.

The device 1000 may decrypt the bitstream, thereby obtaining the decrypted bitstream.

For example, the device 1000 may decrypt the bitstream "0001101" obtained based on the predetermined value, thereby obtaining a decrypted bitstream "0000011".

In operation S1670, the device 1000 may obtain decrypted data corresponding to the decrypted bitstream based on the preset mapping table.

According to some embodiments, the device 1000 may apply binary inverse-conversion to the decrypted bitstream, thereby obtaining a predetermined value.

For example, when the decrypted bitstream is "0000011", the device 1000 may obtain 3 as the predetermined value by performing binary inverse-conversion on "0000011".

The device 1000 may map bit size information of the decrypted bitstream to the mapping table, thereby obtaining various information corresponding to the decrypted bitstream.

For example, the device 1000 may map the bit size information of the decrypted bitstream to the mapping table, thereby obtaining a boundary-variable of the decrypted bitstream.

For example, the device 1000 may match 7, which is the bit size information of the decrypted bitstream ("0000011"), to the mapping table so that the device 1000 may obtain 64 that is a boundary-variable corresponding to the decrypted bitstream ("0000011").

Also, the device 1000 may map the bit size information of the decrypted bitstream to the mapping table, thereby obtaining a maximum-value variable (MV) of the decrypted data corresponding to the decrypted bitstream. The maximum-value variable (MV) means a maximum value of a region including the decrypted data.

According to some embodiments, the device 1000 may obtain the decrypted data corresponding to the decrypted bitstream by using the predetermined value corresponding to the decrypted bitstream, the boundary-variable corresponding to the decrypted bitstream, and the maximum-value variable (MV) corresponding to the decrypted bitstream.

$$If(val3<limit)\{D\_val=val3-MV\}$$
$$else \{D\_val=val3\} \quad \text{[Equation 4]}$$

For example, the device 1000 may obtain the decrypted data by using Equation 4. val3 indicates a predetermined value corresponding to a decrypted bitstream, limit indicates a boundary-variable corresponding to the decrypted bitstream, and MV indicates maximum value information corresponding to the decrypted bitstream.

For example, when the predetermined value (val3) corresponding to the decrypted bitstream is less than the boundary-variable (limit) corresponding to the decrypted bitstream, the device 1000 may determine a result of {predetermined value (val3)−maximum value information (MV) corresponding to decrypted bitstream} to be decrypted data (D_val) corresponding to the decrypted bitstream.

Also, when the predetermined value (val3) corresponding to the decrypted bitstream is greater than the boundary-variable (limit) corresponding to the decrypted bitstream, the device 1000 may determine the predetermined value (val3) to be the decrypted data (D_val) corresponding to the decrypted bitstream.

For example, when the decrypted bitstream is "0000011", the device 1000 may obtain 3 as the predetermined value by performing binary inverse-conversion on "0000011". Also, the device 1000 may match 7, which is the bit size information of the decrypted bitstream ("0000011"), to the mapping table so that the device 1000 may obtain 64 as the boundary-variable corresponding to the decrypted bitstream ("0000011"). Also, the device 1000 may match 7, which is the bit size information of the decrypted bitstream ("0000011"), to the mapping table so that the device 1000 may obtain 127 as maximum value information corresponding to the decrypted bitstream ("0000011").

In this case, 3 that is the predetermined value is less than 64 that is the boundary-variable, thus, the device 1000 may obtain "−124 (3−127=−124)" as the decrypted data (D_val) corresponding to the decrypted bitstream ("0000011").

The device 1000 may decrypt each of coefficients included in an object to be decrypted before entropy encoding is performed, so that the device 1000 may decrypt a multimedia bitstream while a codec characteristic that was previously applied to the multimedia bitstream is maintained.

FIG. 17 is a diagram for describing a method of decrypting a object to be decrypted by using a preset mapping table, the method being performed by the device 1000, according to some embodiments.

According to some embodiments, the device 1000 may determine a range of a value of each of coefficients included in a selected decrypting object to be decrypted, based on a preset mapping table.

For example, the mapping table may classify the range of each of the coefficients as a $0^{th}$ range (0), a $1^{st}$ range (−1, 1), a $2^{nd}$ range (−3, −2, 2, 3), a $3^{rd}$ range (−7, . . . , −4, 4, . . . , 7), a $4^{th}$ range (−15, . . . , −8, 8, . . . , 15), a $5^{th}$ range (−31, . . . , −16, 16, . . . , 31), a $6^{th}$ range (−63, . . . , −32, 32, . . . , 63), a $7^{th}$ range (−127, . . . , −64, 64, . . . , 127), an $8^{th}$ range (−255, . . . , −128, 128, . . . , 255), a $9^{th}$ range (−511, . . . , −256, 256, . . . , 511), a $10^{th}$ range (−1023, . . . , −512, 512, . . . , 1023), or an $11^{th}$ range (−2047, . . . , −1024, 1024, . . . , 2047). The device 1000 may determine the range of each of the coefficients to be one of the $0^{th}$ range through the $11^{th}$ range, based on the mapping table.

Referring to FIG. 17, when a value of a first coefficient from among the plurality of coefficients included in the object to be decrypted is −114, the device 1000 may obtain a range of the value of the first coefficient as the $7^{th}$ range 1710, based on the mapping table.

The device 1000 may match respective determined ranges of the values of the coefficients to the preset mapping table, thereby obtaining respective maximum-value variables (MV) corresponding to the determined ranges.

Referring to FIG. 17, when a range of the value of the first coefficient included in the object to be decrypted is the $7^{th}$ range, the device 1000 may match the $7^{th}$ range to the preset mapping table, thereby obtaining 127 (see 1720) as a maximum-value variable corresponding to the $7^{th}$ range.

The device 1000 may obtain predetermined values based on respective values of the coefficients included in the obtained object to be decrypted and the respective maximum-value variables (MV) corresponding to the determined ranges of the values.

Referring to FIG. 17, when the value of the first coefficient from among the plurality of coefficients included in the object to be decrypted is −114, the device 1000 may determine the range of the value of the first coefficient to be the $7^{th}$ range 1710, based on the mapping table. Also, the device 1000 may obtain, from the mapping table, 127 (see 1720) as a maximum-value variable (Max_val) corresponding to the $7^{th}$ range 1710.

Because −114 that is the first coefficient from among the plurality of coefficients included in the object to be decrypted is less than 0, the device 1000 may obtain the predetermined value (−114+127="3") corresponding to the first coefficient by adding 127 (see 820) that is the maximum-value variable (Max_val) to the value of the first coefficient.

According to some embodiments, the device 1000 may perform binary conversion on the obtained predetermined values. For example, the device 1000 may express the predetermined values as 0 or 1 by performing binary conversion on the predetermined values.

The device 1000 may determine bit size information of the obtained predetermined value. For example, the device 1000 may determine the bit size information, based on a range of a value of the object to be decrypted which corresponds to the obtained predetermined value.

Referring to FIG. 17, the device 1000 may map the $7^{th}$ range, which is the range of the value of the first coefficient, to the mapping table so that the device 1000 may obtain 7 (see 1730) that is the bit size information of the predetermined value.

The device 1000 may perform binary conversion on the obtained predetermined value based on the bit size information.

Referring to FIG. 17, the device 1000 may perform binary conversion on the predetermined value (val=13) by using 7 bits. For example, the device 1000 may convert the predetermined value (val=13) into "0001101".

According to some embodiments, the device 1000 may apply a decrypting process to a bitstream. For example, the device 1000 may decode the bitstream by using the decrypting process that is applicable to the bitstream.

The decrypting process that is applicable to the bitstream may include, but is not limited to, AES, Blowfish, DES, Serpent, Twofish, Camellia, CAST-128, IDEA, RC2, RC5, and SEED.

The device 1000 may decrypt the bitstream, thereby obtaining the decrypted bitstream.

For example, the device 1000 may decrypt the bitstream "0001101" obtained based on the predetermined value, thereby obtaining a decrypted bitstream "0000011".

According to some embodiments, the device 1000 may apply binary inverse-conversion to the decrypted bitstream, thereby obtaining a predetermined value.

For example, when the decrypted bitstream is "0000011", the device 1000 may obtain 13 as a predetermined value by performing binary inverse-conversion on "0001101".

The device 1000 may map bit size information of the decrypted bitstream to the mapping table, thereby obtaining various information corresponding to the decrypted bitstream.

Referring to FIG. 17, the device 1000 may map the bit size information of the decrypted bitstream to the mapping table, thereby obtaining a boundary-variable 1740 of the decrypted bitstream. For example, the device 1000 may match 7, which is the bit size information of the decrypted bitstream ("0000011"), to the mapping table so that the device 1000 may obtain 64 as the boundary-variable 1740 corresponding to the decrypted bitstream ("0000011").

Also, the device 1000 may match the bit size information of the decrypted bitstream to the mapping table, thereby obtaining a maximum-value variable (MV) of decrypted data corresponding to the decrypted bitstream. The maximum-value variable (MV) means a maximum value that may be included in a range of a value including the decrypted data.

Referring to FIG. 17, the device 1000 may match 7, which is the bit size information of the decrypted bitstream ("0000011"), to the mapping table so that the device 1000 may obtain 127 (see 1720) as the maximum-value variable (MV).

According to some embodiments, the device 1000 may obtain the decrypted data corresponding to the decrypted bitstream by using a predetermined value corresponding to the decrypted bitstream, a boundary-variable corresponding to the decrypted bitstream, and a maximum-value variable (MV) corresponding to the decrypted bitstream.

For example, when the predetermined value (val3) corresponding to the decrypted bitstream is less than the boundary-variable (limit) corresponding to the decrypted bitstream, the device 1000 may determine a result of {predetermined value (val3)−maximum value information (MV) corresponding to decrypted bitstream} to be decrypted data (E_val) corresponding to the decrypted bitstream.

Also, when the predetermined value (val3) corresponding to the decrypted bitstream is greater than the boundary-variable (limit) corresponding to the decrypted bitstream, the device 1000 may determine the predetermined value (val3) to be decrypted data (D_val) corresponding to the decrypted bitstream.

Referring to FIG. 17, when the decrypted bitstream is "0000011", the device 1000 may obtain 3 as the predetermined value by performing binary inverse-conversion on "0000011". Also, the device 1000 may match 7 (see 1730), which is the bit size information of the decrypted bitstream ("0000011"), to the mapping table so that the device 1000 may obtain 64 as the boundary-variable 1740 corresponding to the decrypted bitstream ("0000011"). Also, the device 1000 may match 7 (see 1730), which is the bit size information of the decrypted bitstream ("0000011"), to the mapping table so that the device 1000 may obtain 127 (see 1720) as maximum value information corresponding to the decrypted bitstream ("0000011").

In this case, 33 that is the predetermined value is less than 64 that is the boundary-variable 1740, thus, the device 1000 may obtain "−124(3−127=−124)" as the decrypted data (D_val) corresponding to the decrypted bitstream ("0000011").

Figure 18:
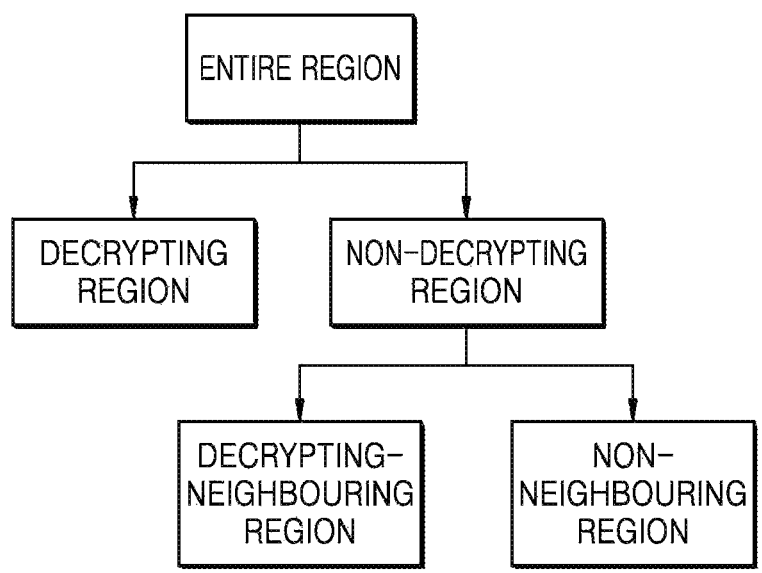
FIG. 18 is a diagram for describing decryption decrypting compensation, according to some embodiments.

FIG. 18 is a diagram for describing decrypting compensation, according to some embodiments.

According to some embodiments, the device 1000 may divide multimedia data into a plurality of regions. For example, the device 1000 may divide an entire region of the multimedia data into a decrypting region and a non-decrypting region.

The device 1000 may select a decrypting region of encrypted multimedia data, based on a user input. Alternatively, the device 1000 may select the decrypting region of the encrypted multimedia data, based on a preset criterion.

The device 1000 may divide the non-encryption region of the multimedia data into a decrypting-neighbouring region and a non-neighbouring region. The decrypting-neighbouring region indicates a region in which the device 1000 uses data included in the decrypting region so as to encode or decode the multimedia data. The non-neighbouring region indicates a region of the non-decrypting region excluding the decrypting-neighbouring region.

For example, when the device 1000 applies a codec to and encodes or decodes picture data including a plurality of blocks, a second block included in the picture data and a non-decrypting region may refer to data of a first region included in a decrypting region. In this case, the device 1000 may classify the second block as a decrypting-neighbouring region.

According to some embodiments, when the device 1000 decrypts the decrypting region of the multimedia data, the device 1000 may perform decrypting by using the methods described above with reference to FIGS. 13 through 17.

For example, the device 1000 may perform decrypting on the decrypting region of the multimedia data and may not perform decrypting on the non-neighbouring region of the non-decrypting region, such that the device 1000 may convert the multimedia data into decrypted multimedia data.

According to some embodiments, when the device 1000 decrypts the multimedia data including the decrypting-neighbouring region, the device 1000 may perform decrypting compensation on the decrypting-neighbouring region.

The decrypting compensation may involve receiving a bitstream.

An encrypting interface 1020 of the device 1000 may apply a sub-coding module to a multimedia bitstream, thereby obtaining processed multimedia data. For example, the encrypting interface 1020 of the device 1000 may apply an entropy decoding module to the multimedia bitstream, thereby obtaining the processed multimedia data.

The entropy decoding module indicates a module to perform entropy decoding. The entropy decoding refers to a coding method of converting a bitstream into data corresponding to the bitstream. The entropy decoding may include, but is not limited to, Huffman coding, arithmetic transformation coding, run-length coding, CAVLC, CABAC, or the like. The decrypting compensation indicates a process of compensating for data of the decrypting-neighbouring region when the device 1000 decrypts the object to be decrypted.

For example, when the device 1000 dcrypts the decrypting region included in the multimedia data, an error may occur in data of the decrypting-neighbouring region because the decrypting-neighbouring region uses data of the decrypting region. In order to prevent the occurrence of the error with respect to the decrypting-neighbouring region, the device 1000 may perform the decrypting compensation on the data of the decrypting-neighbouring region.

Figure 19:
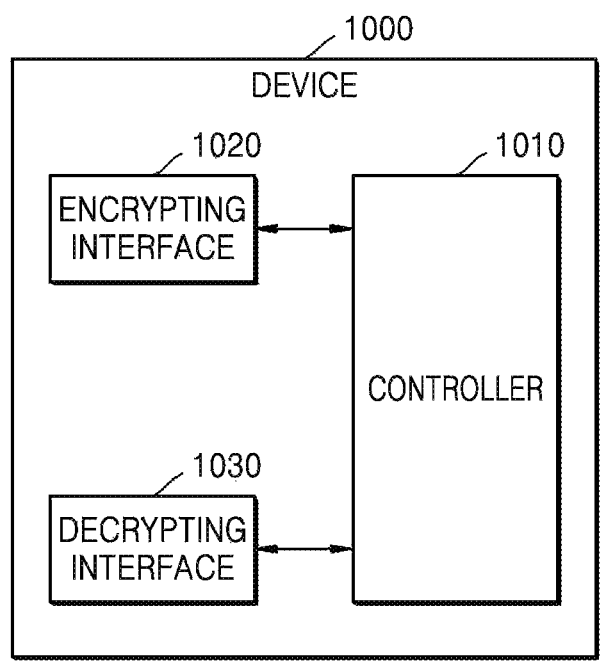
FIG. 19 is a block diagram for describing a device, according to some embodiment.

FIG. 19 is a block diagram for describing a device, according to some embodiments.

According to some embodiments, the device 1000 may include a controller 1010, the encrypting interface 1020, and a decrypting interface 1030. The controller 1010, the encrypting interface 1020, and the decrypting interface 1030 may be implemented by one processor. Alternatively, the controller 1010, the encrypting interface 1020, and the decrypting interface 1030 may be implemented by processors, respectively, or may each be implemented by processors, and the present disclosure is not limited thereto.

According to some embodiments, the encrypting interface 1020 of the device 1000 may obtain multimedia data. The multimedia data refers to various types of data where voice, texts, pictures, video, etc. are mixed. For example, the multimedia data may include, but is not limited to, picture data, song data, video data, audio data, text data, flash data, or the like. Also, the encrypting interface 1020 of the device 1000 may obtain metadata.

The encrypting interface 1020 of the device 1000 may apply at least one sub-coding module to the multimedia data. A sub-coding module refers to a sub-module used in applying various codecs to and compressing the multimedia data. For example, the sub-coding module may include, but is not limited to, a DCT transformation module, a quantization module, a prediction module, an entropy-coding module, and an entropy-decrypting module.

The encrypting interface 1020 of the device 1000 may include a plurality of sub-coding modules. The plurality of sub-coding modules may be implemented by one processor, may be implemented by respective processors, or may each be implemented by a plurality of processors, but the present disclosure is not limited thereto.

The encrypting interface 1020 of the device 1000 may apply at least one sub-coding module to the multimedia data, the metadata, or the combination thereof, thereby obtaining processed multimedia data. For example, the device 1000 may apply the DCT transformation module and the quantization module to the multimedia data, thereby obtaining the processed multimedia data.

The processed multimedia data may include various parameters occurring in a process of encoding the multimedia data. For example, the processed multimedia data may include, but is not limited to, a differentially-coded DC value, quantized samples, and AC coded samples.

According to another embodiment, the encrypting interface 1020 of the device 1000 may obtain the processed multimedia data by using a multimedia bitstream.

The encrypting interface 1020 of the device 1000 may obtain the multimedia bitstream by directly encoding the multimedia data. Also, the encrypting interface 1020 of the device 1000 may obtain the multimedia bitstream from an external device.

According to some embodiments, the encrypting interface 1020 of the device 1000 may select an object to be encrypted.

For example, the encrypting interface 1020 of the device 1000 may select, as the object to be encrypted, some of the processed multimedia data. Also, the encrypting interface 1020 of the device 1000 may select, as the object to be encrypted, an entire portion of the processed multimedia data.

For example, the encrypting interface 1020 of the device 1000 may obtain processed picture data by processing picture data consisting of a plurality of blocks, and may select, as the object to be encrypted, data indicating a first block from among the processed picture data.

The encrypting interface 1020 of the device 1000 may select the object to be encrypted based on a preset criterion. For example, in a case where a person included in the picture data is preset as the object to be encrypted, the encrypting interface 1020 of the device 1000 may process the picture data, and may select, as the object to be encrypted, data indicating the person from among the processed picture data.

Also, the encrypting interface 1020 of the device 1000 may select the object to be encrypted based on a user input. For example, in a case where a user inputs, as the object to be encrypted, a person included in the picture data, the encrypting interface 1020 of the device 1000 may process the picture data, and may select, as the object to be encrypted, data indicating the person from among the processed picture data.

Also, the encrypting interface 1020 of the device 1000 may select the metadata as the object to be encrypted. For example, the device 1000 may select, as the object to be encrypted, an entire portion of the metadata, some of the metadata, or the processed metadata.

According to some embodiments, the selected object to be encrypted may include various parameters. For example, the selected object to be encrypted may include, but is not limited to, a differentially-coded DC value, quantized samples, or AC coded samples.

According to some embodiments, the encrypting interface 1020 of the device 1000 may not convert the selected object to be encrypted into a bitstream but may directly encrypt the selected object to be encrypted.

For example, the encrypting interface 1020 of the device 1000 may encrypt the object to be encrypted by applying a predetermined function to values of the parameters included in the object to be encrypted.

As another example, the encrypting interface 1020 of the device 1000 may encrypt the object to be encrypted by exchanging parameters of a first block included in the object to be encrypted with parameters of a second block, base on a preset rule.

Also, the encrypting interface 1020 of the device 1000 may encrypt the object to be encrypted by changing a sign of the values of the parameters included in the object to be encrypted.

Also, the encrypting interface 1020 of the device 1000 may encrypt the object to be encrypted by changing a sign of the parameters included in the processed multimedia data by using a preset encryption key.

According to another embodiment, the encrypting interface 1020 of the device 1000 may convert the selected object to be encrypted into the bitstream, may encrypt the bitstream, and may convert the encrypted bitstream into data, thereby encrypting the object to be encrypted.

The encrypting interface 1020 of the device 1000 may convert the selected object to be encrypted from among the processed multimedia data into the bitstream.

For example, the encrypting interface 1020 of the device 1000 may map the object to be encrypted to a preset mapping table, thereby obtaining predetermined values corresponding to the object to be encrypted. Also, the encrypting interface 1020 of the device 1000 may perform binary conversion on the obtained predetermined values, thereby obtaining the bitstream corresponding to the object to be encrypted.

When the encrypting interface 1020 of the device 1000 performs binary conversion, the encrypting interface 1020 of the device 1000 may perform binary conversion based on bit size information of each of the predetermined values.

The encrypting interface 1020 of the device 1000 may encrypt the obtained bitstream. For example, the encrypting interface 1020 of the device 1000 may encrypt the obtained bitstream by using an encryption method applicable to the bitstream. The encryption method applicable to the bitstream may include, but is not limited to, AES, Blowfish, DES, Serpent, Twofish, Camellia, CAST-128, IDEA, RC2, RC5, and SEED.

The encrypting interface 1020 of the device 1000 may convert the encrypted bitstream into data, thereby obtaining encrypted data. For example, the encrypting interface 1020 of the device 1000 may obtain the predetermined values by performing binary inverse-conversion on the encrypted bitstream, and may obtain encrypted data by mapping the predetermined values to the preset mapping table.

According to some embodiments, the encrypting interface 1020 of the device 1000 may obtain the encrypted data by encrypting the object to be encrypted. Also, the encrypting interface 1020 of the device 1000 may convert the object to be encrypted from among the processed multimedia data into the encrypted data, so that the encrypting interface 1020 of the device 1000 may convert the processed multimedia data into the encrypted multimedia data. Also, the encrypting interface 1020 of the device 1000 may convert the object to be encrypted from among the processed metadata into the encrypted data, so that the encrypting interface 1020 of the device 1000 may convert the processed metadata into encrypted metadata.

For example, when the object to be encrypted selected by the encrypting interface 1020 of the device 1000 is a first block from among picture data consisting of a plurality of blocks, the encrypting interface 1020 of the device 1000 may obtain encrypted data by encrypting data indicating the first block. The encrypting interface 1020 of the device 1000 may convert data indicating the first block from among processed picture data into the encrypted data, so that the encrypting interface 1020 of the device 1000 may obtain encrypted picture data.

The encrypting interface 1020 of the device 1000 may encode the encrypted multimedia data, thereby generating the encrypted multimedia bitstream. Also, the encrypting interface 1020 of the device 1000 may encode the encrypted metadata, thereby generating an encrypted meta bitstream.

For example, when the encrypting interface 1020 of the device 1000 selects, as the object to be encrypted, data indicating a person from among the processed picture data, the encrypting interface 1020 of the device 1000 may generate encrypted multimedia data by converting the data indicating the person from among the processed picture data into encrypted data, and may generate an encrypted picture bitstream by encoding the encrypted multimedia data.

Encoding may include entropy encoding. Entropy encoding refers to a method of converting data into a bitstream. For example, the encrypting interface 1020 of the device 1000 may convert the encrypted multimedia data into a combination of 1 and 0 by using entropy encoding.

The entropy decoding may include, but is not limited to, Huffman coding, arithmetic transformation coding, run-length coding, CAVLC, CABAC, or the like.

According to some embodiments, the encrypting interface 1020 of the device 1000 may apply, to the encrypted multimedia data, entropy coding corresponding to a codec applied to the multimedia bitstream. Also, the encrypting interface 1020 of the device 1000 may apply, to the encrypted metadata, entropy coding corresponding to a codec applied to the meta bitstream.

For example, when the codec applied to the multimedia bitstream is H.265, and an entropy coding method used in H.265 is CABAC, the device 1000 may entropy encode the encrypted multimedia data by using CABAC.

According to some embodiments, the device 1000 may encrypt the selected object to be encrypted before entropy encoding is performed. The device 1000 encrypts the selected object to be encrypted before entropy encoding is performed, so that the device 1000 may generate the encrypted multimedia bitstream that is usable by an existing decoding device.

According to some embodiments, the decrypting interface 1030 of the device 1000 may obtain the encrypted multimedia bitstream, and may obtain the encrypted multimedia data from the encrypted multimedia bitstream.

For example, the decrypting interface 1030 of the device 1000 may obtain the encrypted multimedia data by performing entropy decoding on the encrypted multimedia bitstream. Entropy decoding indicates a coding method of converting a bitstream into data corresponding to the bitstream. Entropy decoding may include, but is not limited to, Huffman coding, arithmetic transformation coding, run-length coding, CAVLC, CABAC, or the like.

According to some embodiments, the device 1000 may obtain the encrypted meta bitstream. For example, the device 1000 may generate the encrypted meta bitstream or may receive the encrypted meta bitstream from an external device. Also, the device 1000 may obtain the encrypted metadata from the encrypted meta bitstream.

According to some embodiments, the decrypting interface 1030 of the device 1000 may select the object to be decrypted.

For example, the decrypting interface 1030 of the device 1000 may, as the object to be decrypted, search for an encrypted portion by analyzing the encrypted multimedia data. Also, the decrypting interface 1030 of the device 1000 may select the object to be decrypted from the encrypted portion. Also, the device 1000 may search for the encrypted portion by analyzing the encrypted metadata, and may select the object to be decrypted from the encrypted portion.

For example, the decrypting interface 1030 of the device 1000 may obtain a picture bitstream in which a first block and a second block are encrypted. The decrypting interface 1030 of the device 1000 may search of portions indicating the encrypted first block and second block in the picture bitstream, and may select a object to be decrypted from among the portion indicating the first block and the portion indicating the second block.

According to some embodiments, the decrypting interface 1030 of the device 1000 may select, as the object to be decrypted, all of encrypted portions of the encrypted multimedia data, or may select some of the encrypted portions as the object to be decrypted. For example, the decrypting interface 1030 of the device 1000 may select, as the object to be decrypted, all or some of the encrypted portions of the encrypted multimedia data, based on a preset criterion or a user input.

According to some embodiments, the decrypting interface 1030 of the device 1000 may decrypt the selected object to be decrypted. For example, the decrypting interface 1030 of the device 1000 may decrypt the object to be decrypted by using a decrypting process corresponding to an encryption process used in encrypting the decrypting object to be decrypted.

According to some embodiments, the decrypting interface 1030 of the device 1000 may not convert the selected object to be decrypted into a bitstream but may directly decrypt the selected object to be decrypted.

For example, the decrypting interface 1030 of the device 1000 may decrypt the object to be decrypted by applying a predetermined function to values of parameters included in the object to be decrypted.

As another example, the decrypting interface 1030 of the device 1000 may decrypt the object to be decrypted by exchanging parameters of a first block included in the object to be decrypted with parameters of a second block, base on a preset rule.

Also, the decrypting interface 1030 of the device 1000 may decrypt the object to be decrypted by changing a sign of the values of the parameters included in the object to be decrypted.

Also, the decrypting interface 1030 of the device 1000 may decrypt the object to be decrypted by changing a sign of the parameters included in the encrypted multimedia data by using a preset decrypting key.

According to another embodiment, the decrypting interface 1030 of the device 1000 may convert the selected object to be decrypted into the bitstream, may decode the bitstream, and may convert the decrypted bitstream into data, thereby decrypting the object to be decrypted.

The decrypting interface 1030 of the device 1000 may convert the selected object to be decrypted from among the encrypted multimedia data into the bitstream.

For example, the decrypting interface 1030 of the device 1000 may map the object to be decrypted to a preset mapping table, thereby obtaining predetermined values corresponding to the decrypting object to be decrypted. Also, the decrypting interface 1030 of the device 1000 may perform binary conversion on the obtained predetermined values, thereby obtaining the bitstream corresponding to the decrypting object to be decrypted.

When the decrypting interface 1030 of the device 1000 performs binary conversion, the decrypting interface 1030 of the device 1000 may perform binary conversion based on bit size information of each of the predetermined values.

The decrypting interface 1030 of the device 1000 may decrypt the obtained bitstream. For example, the device 1000 may decrypt the obtained bitstream by using a decrypting method applicable to the bitstream. The decrypting method applicable to the bitstream may include, but is not limited to, AES, Blowfish, DES, Serpent, Twofish, Camellia, CAST-128, IDEA, RC2, RC5, and SEED.

The decrypting interface 1030 of the device 1000 may convert the decrypted bitstream into data, thereby obtaining decrypted data. For example, the decrypting interface 1030 of the device 1000 may obtain the predetermined values by performing binary inverse-conversion on the decrypted bitstream, and may obtain the decrypted data by mapping the predetermined values to the preset mapping table.

According to some embodiments, the decrypting interface 1030 of the device 1000 may obtain the decrypted data by decrypting the object to be decrypted. Also, the decrypting interface 1030 of the device 1000 may convert the encrypted multimedia data into the decrypted multimedia data by converting the object to be decrypted of the encrypted multimedia data into the decrypted data.

For example, when the selected object to be decrypted is a first block of picture data consisting of a plurality of blocks, the decrypting interface 1030 of the device 1000 may obtain decrypted data by decrypting data indicating the first block. The decrypting interface 1030 of the device 1000 may obtain decrypted picture data by converting the data indicating the first block of encrypted picture data into the decrypted data.

Also, the decrypting interface 1030 of the device 1000 may convert the encrypted metadata into the decrypted metadata by converting the object to be decrypted of the encrypted metadata into the decrypted data.

The decrypting interface 1030 of the device 1000 may generate the decrypted multimedia bitstream by encoding the decrypted multimedia data. Also, the device 1000 may generate a decrypted meta bitstream by encoding the decrypted metadata.

For example, when the decrypting interface 1030 of the device 1000 selects, as the object to be decrypted, the data indicating the person in the encrypted picture data, the decrypting interface 1030 of the device 1000 may generate decrypted multimedia data by converting the data indicating the person in the encrypted picture data into the decrypted data, and may generate a decrypted picture bitstream by encoding the decrypted multimedia data.

Encoding may include entropy encoding. Entropy encoding may convert data into a bitstream. For example, the decrypting interface 1030 of the device 1000 may convert the decrypted multimedia data into a combination of 1 and 0 by using entropy encoding.

The entropy encoding may include, but is not limited to, Huffman coding, arithmetic transformation coding, run-length coding, CAVLC, CABAC, or the like.

According to some embodiments, the decrypting interface 1030 of the device 1000 may apply, to the decrypted multimedia data, entropy coding corresponding to a codec applied to the encrypted multimedia bitstream.

For example, when the codec applied to the encrypted multimedia bitstream is H.265, and an entropy coding method used in H.265 is CABAC, the device 1000 may entropy encode the decrypted multimedia data by using CABAC.

According to some embodiments, the device 1000 may decrypt the selected object to be decrypted before entropy encoding is performed. The device 1000 decrypts the selected object to be decrypted before entropy encoding is performed, so that the device 1000 may generate the decrypted multimedia bitstream that is usable by an existing decoding device.

Figure 20:
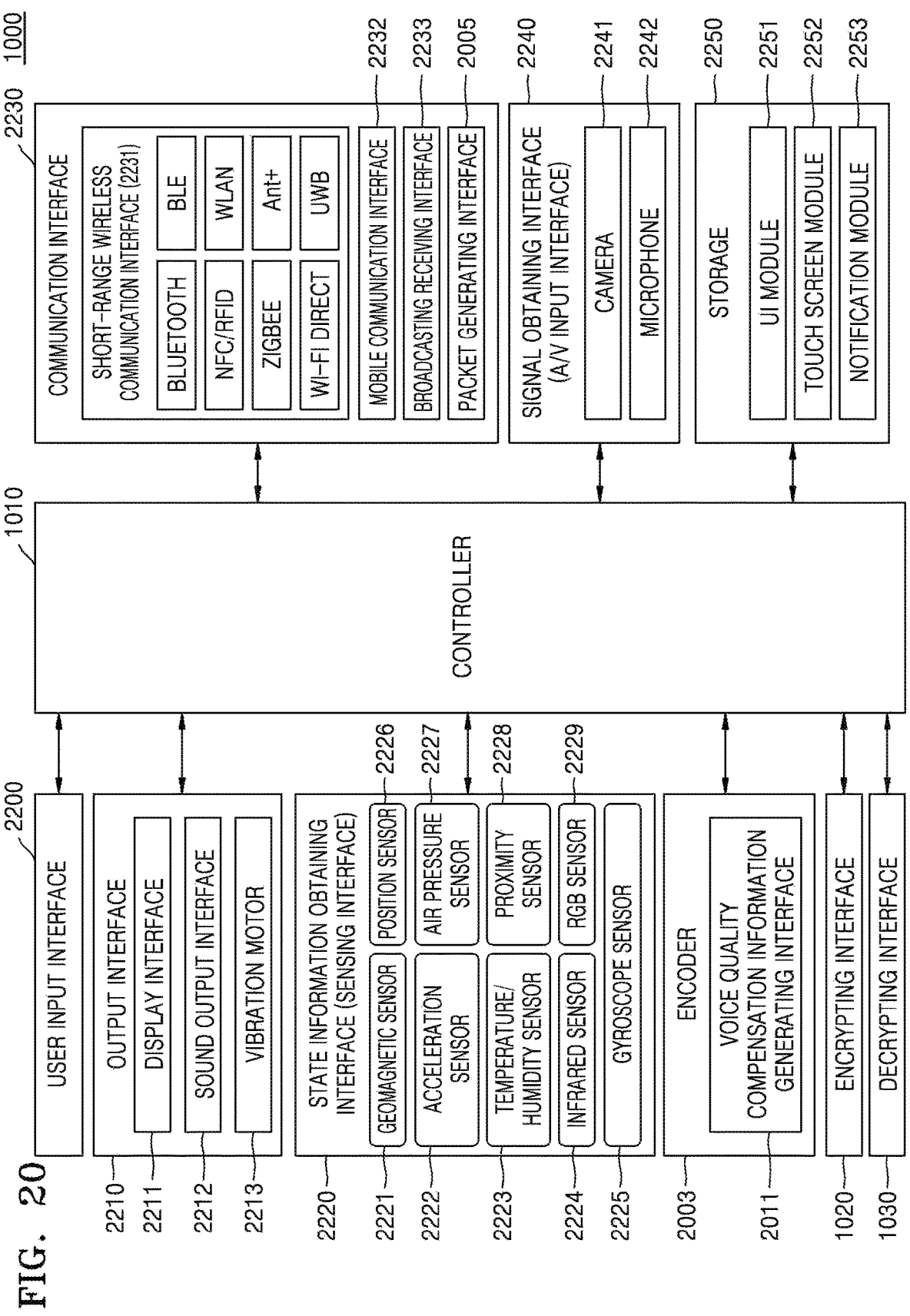
FIG. 20 is a detailed block diagram for describing a device, according to some embodiments.

FIG. 20 is a detailed block diagram for describing a device, according to some embodiments.

As illustrated in FIG. 20, the device 1000 according to some embodiments may further include a user input interface 2200, an output interface 2210, a sensing interface 2220, a communication interface 2230, an audio/video (A/V) input interface 2240, and a storage 2250, in addition to the controller 1010, the encrypting interface 1020, and the decrypting interface 1030.

The communication interface 2230 may include a short-range wireless communication interface 2231, a mobile communication interface 2232, and a broadcasting receiving interface 2233.

The short-range wireless communication interface 2231 may include, but is not limited to, a Bluetooth communication interface, a Bluetooth Low Energy (BLE) communication interface, a near field magnetic field communication interface, a WLAN (Wi-Fi) communication interface, a Zigbee communication interface, an infrared Data Association (IrDA) communication interface, a Wi-Fi Direct (WFD) communication interface, a ultra wideband (UWB) communication interface, and an Ant+ communication interface.

The mobile communication interface 2232 exchanges a wireless signal with at least one of a base station, an external terminal, and a server on a mobile communication network. The wireless signal may include various types of data according to communication of a sound call signal, a video call signal, or a text/multimedia message.

The broadcasting receiving interface 2233 receives a broadcast signal and/or information related to a broadcast from the outside through a broadcast channel. The broadcast channel may include a satellite channel and a ground wave channel. In another embodiment, the device 1000 may not include the broadcasting receiving interface 2233.

Also, the communication interface 2230 may transmit or receive encrypted data, and may also transmit or receive encrypted group information. This corresponds to the descriptions described above, thus, detailed descriptions thereof are omitted here.

The storage 2250 may store a program for processing and controlling the controller 1010, and may store data input to the device 1000 or output from the device 1000.

The storage 2250 may include a storage medium of at least one type of a flash type memory, a hard disk type memory, a multimedia card type memory, a card type memory such as a secure digital (SD) or xD-Picture (xD) card memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The programs stored in the storage 2250 may be classified into a plurality of modules according to their functions, for example, into a user interface (UI) module 2251, a touch screen module 2252, a notification module 2253, etc.

The UI module 2251 may provide a specialized UI or graphical user interface (GUI) associated with the device 1000 for each application. The touch screen module 2252 may detect a user's touch gesture on the touch screen and transmit information related to the touch gesture to the controller 1010. The touch screen module 2252 according to some embodiments may recognize and analyze a touch code. The touch screen module 2252 may be embodied as separate hardware including a controller.

Various sensors may be arranged in or near the touch screen so as to detect a touch or a proximate touch on the touch sensor. An example of the sensor to detect the touch on the touch screen may include a tactile sensor. The tactile sensor detects a contact of a specific object at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or that exists nearby, by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture of the user may include a tap gesture, a touch & hold gesture, a double tap gesture, a drag gesture, a panning gesture, a flick gesture, a drag & drop gesture, a swipe gesture, or the like.

The notification module 2253 may generate a signal for notifying a user about an occurrence of an event in the device 1000. Examples of the event that may occur in the device 1000 include a call signal receiving event, a message receiving event, a key signal input, a schedule notifying event, or the like. The notification module 2253 may output an alarm signal in the form of a video signal via a display interface 2211, an alarm signal in the form of an audio signal via a sound output interface 2212, or an alarm signal in the form of a vibration signal via a vibration motor 2213.

Operations performed by the storage 2250 correspond to the descriptions described above, thus, detailed descriptions thereof are omitted here.

The controller 1010 generally controls all operations of the device 1000. For example, the controller 1010 may execute programs stored in the device 1000, thereby generally controlling elements included in the device 1000. This corresponds to the descriptions described above, thus, detailed descriptions thereof are omitted here.

A user input interface 2200 refers to a unit through which a user inputs data to control the device 1000. For example, the user input interface 2200 may include, but is not limited to, a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch.

The output interface 2210 may output an audio signal, a video signal, or a vibration signal, and may include the display interface 2211, the sound output interface 2212, and the vibration motor 2213.

The display interface 2211 displays and outputs information processed in the device 1000.

When the display interface 2211 and a touch pad form a mutual layer structure and then are formed as a touch screen, the display interface 2211 may be used as both an output device and input device. The display interface 2211 may include at least one of liquid crystal display (LCD), a thin film transistor-liquid crystal display (TFT-LCD), an organic light-emitting diode (OLED) display, a flexible display, a three-dimensional (3D) display, and an electrophoretic display. According to a type of the device 1000, the device 1000 may include at least two display interfaces 2211. Here, the at least two display interfaces 2211 may be disposed to face each other by using a hinge.

The sound output interface 2212 may output audio data that is received from the communication interface 2230 or is stored in the storage 2250. The sound output interface 2212 may also output a sound signal (e.g., a call signal receiving sound, a message receiving sound, a notifying sound, or the like) related to capabilities performed by the device 1000. The sound output interface 2212 may include a speaker, a buzzer, or the like.

The vibration motor 2213 may output a vibration signal. For example, the vibration motor 2213 may output the vibration signal that corresponds to an output of the audio data (e.g., the call signal receiving sound, the message receiving sound, or the like) or video data. When a touch is input to the touch screen, the vibration motor 2213 may output a vibration signal.

The sensing interface 2220 may sense a state of the device 1000 or a status around the device 1000 and may transfer sensed information to the controller 1010.

The sensing interface 2220 may include, but is not limited to, at least one of a geomagnetic sensor 2221, an acceleration sensor 2222, a temperature/humidity sensor 2223, an infrared sensor 2224, a gyroscope sensor 2225, a position sensor (e.g., a global positioning system (GPS)) 2226, an air pressure sensor 2227, a proximity sensor 2228, and an illuminance sensor 2229. Functions of the sensors may be intuitionally deduced by one of ordinary skill in the art by referring to names of the sensors, and thus, detailed descriptions thereof are omitted here.

The A/V input interface 2240 may receive an input of an audio signal or a video signal and may include a camera 2241 and a microphone 2242. The camera 2241 may obtain an image frame such as a still image or a moving picture via an image sensor during a video call mode or an image-capturing mode. An image that is captured via the image sensor may be processed by the controller 1010 or a separate image processing interface (not shown).

The image frame that is processed by the camera 2241 may be stored in the storage 2250 or may be transmitted to an external source via the communicator 150. According to a configuration of the device 1000, two or more cameras 2241 may be arranged.

The microphone 2242 receives an input of an external sound signal and processes the received sound signal into electrical voice data. For example, the microphone 2242 may receive a sound signal from the device 1000 or a speaker. In order to remove noise that occurs while the sound signal is being externally input, the microphone 2242 may use various noise removing algorithms.

The device according to the present disclosure may include a processor, a memory for storing and executing program data, a permanent storage including a disk drive, a communication port for communication with an external device, a user interface device including a touch panel, a key, a button, and the like. The methods embodied as a software module or an algorithm may be stored as computer readable codes or program commands that are executable on the processor in a computer readable recording medium. The computer readable recording medium is any data storage device that can store data which can be thereafter read by a computer system. Examples of the computer readable recording medium include magnetic storage media (e.g., read-only memory (ROM), random-access memory (RAM), floppy disks, hard disks, etc) and optical reading media (CD-ROMs, digital versatile discs (DVDs), etc.) or the like. The computer-readable recording medium can also be distributed over network-coupled computer systems so that the computer-readable code is stored and executed in a distributed fashion. The media can be read by computers, can be stored in the memory, and can be executed on the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the preferred embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the present disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of conventional techniques for electronics configuration, signal processing and/or control, data processing and the like. The words 'mechanism', 'element', 'means', and 'configuration' are used broadly and are not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, conventional electronics, control systems, software and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those skilled in this art without departing from the spirit and scope of the present disclosure.

The invention claimed is:

1. A method of generating an encrypted multimedia bitstream, the method comprising:
   obtaining a multimedia data;
   obtaining processed multimedia data including a plurality of parameters by performing at least one of encoding, entropy decoding, discrete cosine transform (DCT) transformation, or quantization on the obtained multimedia data;
   selecting an object to be encrypted, including at least one of the plurality of parameters, from among the processed multimedia data;
   encrypting the selected object to be encrypted;
   based on a result of the encrypting, inserting the encrypted selected object into the processed multimedia data to generate encrypted multimedia data; and
   generating an encrypted multimedia bitstream by encoding the encrypted multimedia data,
   wherein the plurality of parameters comprises at least one of a differentially-coded DC value, quantized samples, or AC coded samples.

2. The method of claim 1, wherein the encoding of the encrypted processed multimedia data comprises entropy encoding of the processed multimedia data, and the encrypting is performed before the entropy encoding of the processed multimedia data is performed.

3. The method of claim 1, wherein the encrypting of the selected object to be encrypted comprises directly encrypting the selected object to be encrypted, excluding a process of converting the selected object to be encrypted into the encrypted multimedia bitstream.

4. The method of claim 1, wherein the selecting of the object to be encrypted comprises selecting some of the processed multimedia data.

5. The method of claim 1, wherein the encoding comprises applying entropy coding to the encrypted multimedia data, and
wherein the entropy coding comprises one from among Huffman coding, arithmetic transformation coding, fixed length coding, context-adaptive variable-length (CAVLC) coding, and context-adaptive binary arithmetic coding (CABAC).

6. A method of decrypting an encrypted multimedia bitstream, the method comprising:
obtaining encrypted multimedia data, including a plurality of parameters, by decoding an encrypted multimedia bitstream;
selecting an object to be decrypted, including at least one of the plurality of parameters, from among the encrypted multimedia data;
decrypting the selected object to be decrypted;
based on a result of the decrypting, inserting the decrypted selected object into the encrypted multimedia data to generate decrypted multimedia data; and
generating a decrypted multimedia bitstream by encoding the decrypted multimedia data,
wherein the encrypted multimedia bitstream is generated by:
obtaining a multimedia data;
obtaining processed multimedia data including the plurality of parameters by performing at least one of encoding, entropy decoding, discrete cosine transform (DCT) transformation, or quantization on the obtained multimedia data;
selecting an object to be encrypted, including at least one of the plurality of parameters, from among the processed multimedia data;
encrypting the selected object to be encrypted;
based on a result of the encrypting, inserting the encrypted selected object into the processed multimedia data to generate encrypted multimedia data; and
encoding the encrypted multimedia data, and
wherein the plurality of parameters comprises at least one of a differentially-coded DC value, quantized samples, or AC coded samples.

7. The method of claim 6,
wherein the decoding comprises entropy decoding, and the encoding comprises entropy encoding, and
wherein the decrypting is performed after the entropy decoding is performed and before the entropy encoding is performed.

8. The method of claim 6, wherein the decrypting of the selected object to be decrypted comprises directly decrypting the selected object to be decrypted, excluding a process of converting the selected object to be decrypted into the encrypted multimedia bitstream.

9. A device for generating an encrypted multimedia bitstream, the device comprising:
an encrypting interface configured to:
obtain a multimedia data,
obtain processed multimedia data, including a plurality of parameters by performing at least one of encoding, entropy decoding, discrete cosine transform (DCT) transformation, or quantization on the obtained multimedia data,
select an object to be encrypted, including at least one of the plurality of parameters, from among the processed multimedia data,
encrypt the selected object to be encrypted,
based on a result of the encrypting, insert the encrypted selected object into the processed multimedia data to generate encrypted multimedia data, and
generate an encrypted multimedia bitstream by encoding the encrypted multimedia data,
wherein the plurality of parameters comprises at least one of a differentially-coded DC value, quantized samples, or AC coded samples.

10. The device of claim 9, wherein the encoding of the encrypted processed multimedia data comprises entropy encoding of the encrypted processed multimedia data, and the encrypting is performed before the entropy encoding of the encrypted processed multimedia data is performed.

11. The device of claim 9, wherein the encrypting interface is further configured to directly encrypt the selected object to be encrypted, excluding a process of converting the selected object to be encrypted into the encrypted multimedia bitstream.

12. A device for decrypting an encrypted multimedia bitstream, the device comprising:
a decrypting interface configured to:
obtain encrypted multimedia data, including a plurality of parameters by decoding an encrypted multimedia bitstream,
select an object to be decrypted, including at least one of the plurality of parameters, from the encrypted multimedia data,
decrypt the selected object to be decrypted,
based on a result of the decrypting, inserting the decrypted selected object into the encrypted multimedia data to generate decrypted multimedia data, and
generate a decrypted multimedia bitstream by encoding the decrypted multimedia data,
wherein the encrypted multimedia bitstream is generated by:
obtaining a multimedia data,
obtaining processed multimedia data, including the plurality of parameters by performing at least one of encoding, entropy decoding, discrete cosine transform (DCT) transformation, or quantization on the obtained multimedia data,
selecting an object to be encrypted, including at least one of the plurality of parameters, from among the processed multimedia data,
encrypting the selected object to be encrypted,
based on a result of the encrypting, inserting the encrypted selected object into the processed multimedia data to generate encrypted multimedia data, and
generating an encrypted multimedia bitstream by encoding the encrypted multimedia data, and wherein the plurality of parameters comprises at least one of a differentially-coded DC value, quantized samples, or AC coded samples.

13. The device of claim 12, wherein the decoding comprises entropy decoding, and the encoding comprises entropy encoding, and wherein the decrypting is performed after the entropy decoding is performed and before the entropy encoding is performed.

14. The device of claim 12, wherein the decrypting interface is further configured to directly decrypt the selected object to be decrypted, excluding a process of converting the selected object to be decrypted into the encrypted multimedia bitstream.

* * * * *